United States Patent
Francis et al.

(10) Patent No.: US 7,670,502 B2
(45) Date of Patent: Mar. 2, 2010

(54) LIQUID CRYSTAL COMPOSITION FOR BISTABLE LIQUID CRYSTAL DEVICES

(75) Inventors: Matthew Francis, Walton (GB); Marc John Goulding, Ringwood (GB); John Clifford Jones, Leighsinton (GB); Stephen Beldon, Ledbury (GB); Peer Kirsch, Kanagawa (JP)

(73) Assignee: Merck Patent GmbH, Darmstadt (DE)

( * ) Notice: Subject to any disclaimer, the term of this patent is extended or adjusted under 35 U.S.C. 154(b) by 499 days.

(21) Appl. No.: 10/590,353

(22) PCT Filed: Jan. 31, 2005

(86) PCT No.: PCT/EP2005/000909

§ 371 (c)(1), (2), (4) Date: Aug. 23, 2006

(87) PCT Pub. No.: WO2005/081215

PCT Pub. Date: Sep. 1, 2005

(65) Prior Publication Data

US 2007/0176144 A1    Aug. 2, 2007

(30) Foreign Application Priority Data

Feb. 24, 2004    (EP) .................................. 04004100

(51) Int. Cl.
C09K 19/00 (2006.01)
C09K 19/06 (2006.01)
C09K 19/52 (2006.01)

(52) U.S. Cl. ............................... 252/299.01; 252/299.6; 252/299.63; 252/299.66; 430/20; 430/270.1; 428/1.1; 428/1.3; 349/177; 349/182

(58) Field of Classification Search ............ 252/299.01, 252/299.6, 299.63, 299.66; 430/20, 270.1; 428/1.1, 1.3; 349/177, 182
See application file for complete search history.

(56) References Cited

U.S. PATENT DOCUMENTS

| | | | |
|---|---|---|---|
| 5,458,804 A | 10/1995 | Yamada et al. | |
| 6,287,647 B1 | 9/2001 | Kobayashi et al. | |
| 6,599,589 B1 | 7/2003 | Iwamatsu et al. | |
| 7,258,903 B2 * | 8/2007 | Francis et al. | 428/1.1 |
| 7,294,368 B2 * | 11/2007 | Francis et al. | 428/1.1 |
| 7,335,404 B2 * | 2/2008 | Goulding et al. | 428/1.3 |
| 2003/0077405 A1 | 4/2003 | Miyazawa et al. | |
| 2004/0076769 A1 | 4/2004 | Nakata et al. | |

FOREIGN PATENT DOCUMENTS

| | | |
|---|---|---|
| EP | 0 571 955 A | 12/1993 |
| EP | 1 245 660 A | 10/2002 |
| JP | 09 217062 A | 8/1997 |
| JP | 2000 336360 A | 12/2000 |
| JP | 2003 147362 A | 5/2003 |
| WO | WO 2004/053020 A | 6/2004 |
| WO | WO 2004/053021 A | 6/2004 |
| WO | WO 2004/099343 A | 11/2004 |

OTHER PUBLICATIONS

Database WPI; Section CH, Week 199743, Derwent Publications Ltd., London, GB; AN 1997-466326; XP002330805.
Database WPI; Section CH, Week 200111; Derwent Publications Ltd., London, GB; AN 2001-098003; XP002330806.
Patent Abstracts of Japan; vol. 2003, No. 09, Sep. 3, 2003.
Goto et al: "Fluorinated Liquid Crystals for Active Matrix Displays" Molecular Crystals and Liquid Crystals, Gordon and Breach, Oolondon, GB, vol. 209, 1991, pp. 1-7, XP009033843; ISSN: 0026-8941.
Jones et al: "P-26.3: Low Voltage Zenithal Bistable Devices With Wide Operating Windows" 2003 SID International Symposium Digest of Techniacl Papers, vol. XXXIV, 2003, pp. 954-958, XP007008277.
Jones et al: Novel Bistable Liquid Crystal Displays Based on Grating Alignment: Proceedings of the SPIE, SPIE, Bellingham, VA, US, vol. 3955, Jan. 27, 2000, pp. 84-93, XP008003419; ISSN: 0277-786X.

* cited by examiner

*Primary Examiner*—Geraldina Visconti
(74) *Attorney, Agent, or Firm*—Millen, White, Zelano, Branigan, P.C.

(57) ABSTRACT

The invention is directed to liquid crystal compositions for use in bistable liquid crystal devices and to bistable liquid crystal devices containing said liquid crystal compositions. The liquid crystal composition comprises a component ($\pi$) said component ($\pi$) containing one or more compounds having a phenyl ring of formula A Whereby $X^A$ is F, CI, $SF_5$, NCS or a $C_1$ to $C_8$ alkanyl, alkenyl or alkoxy radical substituted with at least one F atom; and $L^A$ is H or F.

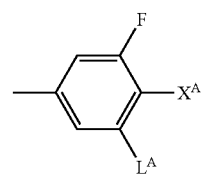

(A)

15 Claims, 3 Drawing Sheets a) continuous state     b) defect state a) VAN ZBD     b) twisted ZBD

LIQUID CRYSTAL COMPOSITION FOR BISTABLE LIQUID CRYSTAL DEVICES

The invention is directed to liquid crystal (LC) compositions for use in bistable liquid crystal devices and to bistable liquid crystal devices containing said liquid crystal compositions.

Figure 1:
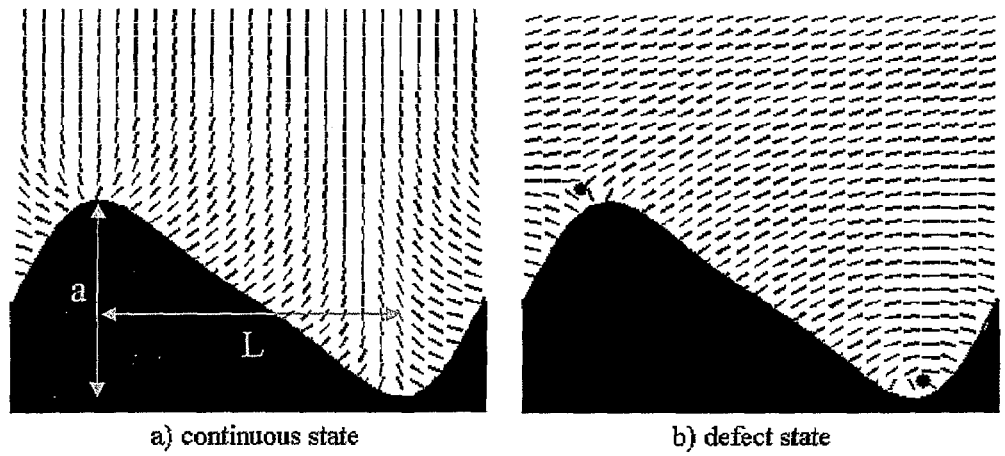
FIG. 1 is an illustration of zenithal bistability using grating alignment (with the lines indicating the local director) showing a) the high tilt (continuous) and b) the low tilt (defect) states.

Electrooptical devices utilizing liquid crystal media for displaying information are well known and used in a wide variety of technical applications (see, for a review, H. Kawamoto, Proc. IEEE, 90, 460 (2002)). Among these, nematic liquid crystal devices are the most prominent; there are, for instance, twisted nematic (TN) liquid crystal devices (M. Schadt and W. Helfrich, Appl. Phys. Lett., 18, 127 (1971)) and super-twisted nematic (STN) liquid crystal devices (see, inter alia, T. J. Scheffer and J. Nehring, Appl. Phys. Lett., 48, 1021 (1984)). These devices are monostable, i.e. the liquid crystal medium is switched to an ON state by application of a suitable voltage, and is allowed to switch to an OFF state when the voltage applied falls below a lower voltage level.

In order to display complex information, electrooptical devices need to comprise a number of picture elements that can be switched independently of each other. However, when direct or even multiplex addressing of pixels are used, the number of elements addressable in nematic liquid crystal displays is limited, in the first case by mere geometrical requirements of the electrical connections and in the second case by the steepness of the device's transmission versus the voltage curve.

This limitation can be overcome by incorporating thin film transistors (TFT) into each picture element. Such devices, also known as active matrix (AM) displays, enable addressing of a high number of picture elements and thus of large area, high resolution displays and with relatively low voltage requirements. Some of these devices are also mechanically rather stable and have a wide temperature range.

Usually AM-TFT displays are operated in a monostable driving mode. Hence, the device has no intrinsic or internal memory and constant update of the display even for static images is required. This may cause relatively high power consumption and rather poor battery lifetime.

Another type of liquid crystal device are displays with an internal memory effect, e.g. a bistable liquid crystal device. Bistability means that the molecules of the liquid crystal medium inside the device can adopt two different stable states. Consequently, by applying a suitable addressing scheme, the liquid crystal molecules of the medium are switched into a first stable state that persists even after addressing; utilization of another addressing scheme causes the liquid crystal molecules to adopt a second stable state that likewise persists after addressing. For some specific applications direct or multiplex addressing of such bistable liquid crystal compositions is suitable, and thus the more complicated AM addressing is not required for these applications. However, if desired, AM addressing may also be used for driving bistable liquid crystal devices.

Ferroelectric liquid crystal displays using smectic liquid crystal materials can be made into bistable devices. They have, however, several disadvantages, e.g. lack of shock resistance, narrow operating temperature range, and low cell gap causing manufacturing difficulties. Therefore, these ferroelectric liquid crystal devices are unlikely to fulfill the requirements to displays for the devices mentioned above.

However, not only ferroelectric smectic liquid crystals are capable of being used in bistable devices but also nematic liquid crystals. Besides other approaches that utilize bistable bulk configurations adopted by nematic liquid crystals (see, for instance, I. Dozov et al., "Recent improvements of bistable nematic displays switched by anchoring breaking (BiNem®)", Proceedings SID 01 (2001), 16.1, 224 and references therewithin), a promising way of achieving bistability in a nematic liquid crystal display is to use a surface alignment which can support two or more stable states. As discussed in literature (see, for instance, J. C. Jones, G. Bryan-Brown, E. Wood, A. Graham, P. Brett and J. Hughes, "Novel bistable liquid crystal displays based on grating alignment", in "Liquid Crystal Materials, Devices, and Flat Panel Displays", R. Shashidhar, B. Gnade, Eds., Proceedings of SPIE Vol. 3955 (2000), 84 and references cited therein) two types, azimuthal and zenithal bistability, can be distinguished.

In the first instance (i.e. azimuthal bistability), the director of the liquid crystal molecules in the display having a grating alignment on the surface of one of the display cell's plates (or substrates) will lie parallel to said plate in both stable states; that means that switching between the stable states occurs within the plane of the display cell's plates (see, for instance, WO 92/00546 and WO 95/22077 which describes the use of a substrate having a bigrating alignment layer). However, reproducing selection of the stable states is found to be difficult and switching generally requires a high switching voltage.

On the other hand, zenithal bistability is observed when the zenithal bistable surface is used (see FIG. 1; the tiny lines represent the local director of the liquid crystal molecules that are oriented by interaction with the surface grating and appropriate alignment layer). With such a surface, the director of the liquid crystal molecules has two possible configurations with different pretilt angles in the same azimuthal plane (i.e. the plane perpendicular to the surface of the display cell's substrate). The first state is the continuous high tilt state (C) while the second state is the defect low tilt state (D). The grating of the zenithal bistable surface is defined by its amplitude a and its pitch L; typical values are for L of about 1 μm and for a of about 0.6 to 0.8 μm (see WO 97/14990 and, for more details, WO 02/08825; and J. C. Jones, G. Bryan-Brown, E. Wood, A. Graham, P. Brett and J. Hughes, "Novel bistable liquid crystal displays based on grating alignment", in "Liquid Crystal Materials, Devices, and Flat Panel Displays", R. Shashidhar, B. Gnade, eds., Proceedings of SPIE Vol. 3955 (2000), 84).

A homeotropic orientation can be induced, for example by coating the grating with a homeotropic alignment layer. This homeotropic alignment induced orientation ensures that the director of the liquid crystal molecules does not lie parallel to the grooves of the grating. Although the orientation of the director of the liquid crystal molecules is perpendicular to the (local) surface, i.e. varying with the location on the surface along a direction perpendicular to the grooves, the orientation in the "bulk" is very much influenced by the opposite surface alignment in both states. Switching from one stable state to the other may be achieved by applying a simple electrical pulse thereby causing a switch from a black display or picture element to a white one (or vice versa) with the appropriate polariser configuration and retardation. Switching back to the original state occurs upon application of a pulse of opposite polarity thereby causing a switch from white to black (or vice versa). Switching may also be induced by using pulses of same polarity but with much higher voltages (also referred to as "reverse switching"); however, reverse switching is a detrimental effect which limits the operation of a zenithal bistable nematic device in terms of the addressing and so a high a voltage as possible is desired for the reverse switching.

Figure 2:
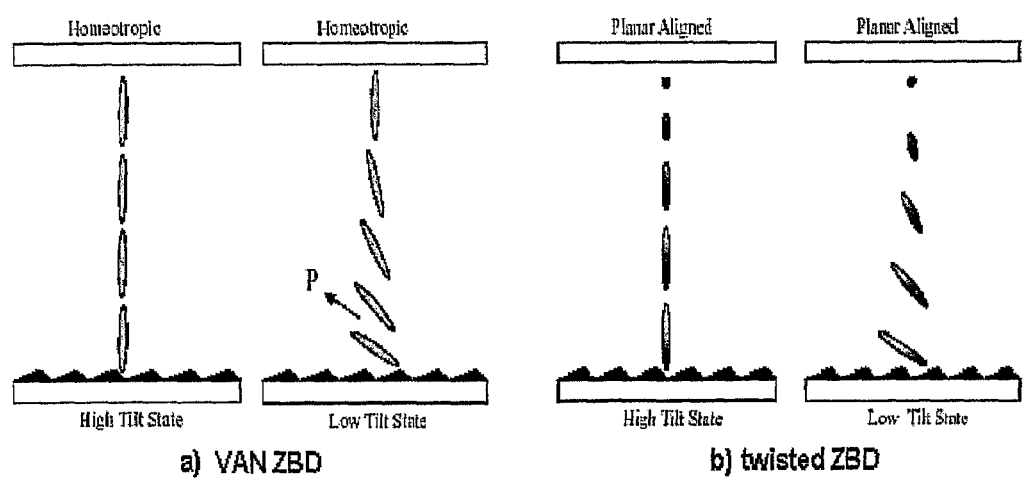
FIG. 2 depicts a) the VAN-HAN and b) the HAN-TN geometries for ZBD showing the director distribution of the high and low tilt states.

In general, for obtaining zenithal bistability only one of the two display cell substrates is provided with a surface grating. The opposite plate may have a surface providing a homeotropic alignment of the liquid crystal director (vertically aligned nematic or VAN mode, see FIG. 2a)) or a surface inducing planar alignment of the director (TN mode, see FIG. 2b)) thereby causing the twisting of the liquid crystal director around the axis perpendicular to the substrates across the cell for the low tilt state. Exact details regarding cell geometry and configuration, exact cell parameters, addressing means, assembling of the entire zenithal bistable device (including use of polarisers) etc. are disclosed in WO 97/14990; E. L. Wood, G. P. Bryan-Brown, P. Brett, A. Graham, J. C. Jones, and J. R. Hughes, "Zenithal Bistable Device (ZBD™) Suitable for Portable Applications, SID 00 Digest (2000), 124; J. C. Jones, J. R. Hughes, A. Graham, P. Brett, G. P. Bryan-Brown, and E. L. Wood, "Zenithal Bistable Devices: Towards the electronic book with a simple LCD", IDW '00 (2000), 301; J. C. Jones, S. M. Beldon and E. L. Wood, "Greyscale in Zenithal Bistable LCD: The Route to Ultra-low Power Colour Displays", seminar talk on the ASID meeting 2002 of the Society for Information Display, Singapore, September 2002; and the detailed discussion given in J. C. Jones, G. Bryan-Brown, E. Wood, A. Graham, P. Brett and J. Hughes, "Novel bistable liquid crystal displays based on grating alignment", in "Liquid Crystal Materials, Devices, and Flat Panel Displays", R. Shashidhar, B. Gnade, eds., Proceedings of SPIE Vol. 3955 (2000), 84, and references cited therein.

Utilizing zenithal bistability in electrooptical devices offers attractive features, inter alia:
Image retention on a display without continuous update combined with
High mechanical shock stability
Low power consumption since the display only needs addressing when the image changes
Eminent suitability for use with plastic substrates Moreover, both transmissive and reflective modes are possible in displays utilizing zenithal bistability. A display using a transmissive mode requires a backlight on the display's rear side being permanently switched on. This contributes significantly to the overall power consumption of the display. Further, when using the transmissive display under conditions of high brightness, e.g. in direct sunlight, the contrast may become rather poor rendering the display almost unreadable. To the contrary, a reflective display has no backlight but a reflector on its rear side thereby utilizing the surrounding light falling on the display for its illumination by reflection. Power consumption is lower compared to the transmissive display, and the contrast is good under conditions of high brightness making the reflective display especially useful for outdoor and daylight use. However, under poor illumination conditions, e.g. in the darkness, the reflective display becomes hardly readable. Therefore, so-called transflective displays have been suggested and disclosed (see, for instance, U.S. 2003/0043323 A1) in order to overcome the disadvantages of both transmissive and reflective modes while still utilizing their advantages. In general, a transflective display is utilizing the reflective mode using a partial reflector on the rear side of the display so that in the transmissive mode a backlight can be turned on in order to fit the lightning conditions.

Figure 3:
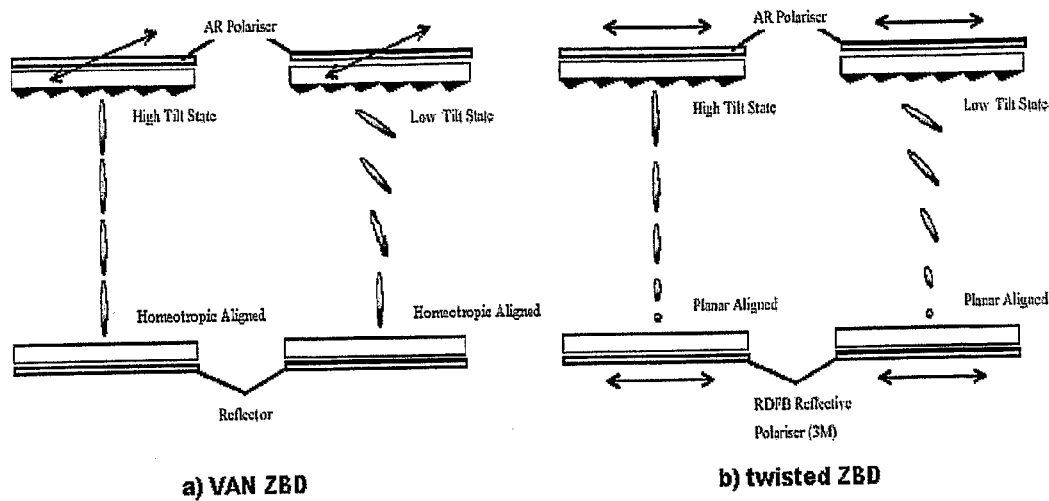
FIG. 3 shows a) the VAN-HAN and b) the HAN-TN geometries for ZBD reflective devices.

Reflective and transflective modes both may be applied to displays-utilizing zenithal bistability (see, e.g., J. C Jones, P. Worthing, G. Bryan-Brown, E. Wood, SID 03 Digest (2003), P-14.1). The display geometries that are favoured for these applications are the vertically aligned nematic (VAN) mode for a single polarizer device in the retardation mode (see FIG. 3a)) and the twisted nematic (TN) mode for single and two-polariser devices in the polarization mode (with the two-polariser device shown in FIG. 3b)). (However, other display geometries like, for instance, the Mixed mode of twisted nematic liquid crystal compositions (MTN mode; S.-T. Wu, C.-S. Wu, Appl. Phys. Lett. 68 (11) 1996, 1455) may also be used.) The two-polariser reflective device works in the modified TN $1^{st}$ minimum condition (C. H. Gooch and H. A. Tarry, "The Optical Properties of Twisted Nematic Liquid Crystal Structures with Twist Angles $\leq 90°$", J. Appl. Phys. D: Appl. Phys., Vol. 8, p. 1575-1584, 1975) with $$d_{opt} \approx \frac{\sqrt{3}}{2} \frac{\lambda_0}{\Delta n} + 0.4,$$

whereby $\lambda_0$ is 0.555 µm and $d_{opt}$ is the optimal cell gap as for the standard transmission mode. For optimum viewing angles it preferably uses the lowest defect state pretilt on the grating of the zenithal bistable surface, which in turn actually requires a lower $\Delta n$ for the same cell gap. The 0.4 µm factor is an adjustment to give the best optical performance for a given birefringence with the defect state pretilt currently used. For the single polariser TN mode, however, the twisted state is used to give the black state and the hybrid state is then the white state, as it has no retardation if the appropriate polariser orientation is used.

For the single polariser VAN-HAN mode (FIG. 3a)) the VAN state (high tilt C state in FIG. 3a)) does cause any retardation and so appears white against a reflector. The hybrid aligned nematic (HAN) state (low tilt D state in FIG. 3a)), however, will have some retardation and if this acts as a quarter-wave plate (i.e. with the two passes then equivalent to a half-wave plate causing a 90° rotation of the plane of polarized light) it appears black as there is no transmission of the reflected light at the polariser. (Here, the optimal cell gap is given by $$d_{opt} \approx \frac{\lambda_0}{2\Delta n} + 0.4.)$$

The optical performance of such a device may be improved by using a quarter-wave plate between the polariser and liquid crystal cell, and in this case the optical states are reversed (i.e. the VAN state is black and the HAN state is white).

Besides the assembly and make up of the zenithal bistable display, another key issue to the zenithal bistable device technology is the nematic liquid crystal medium used inside the display cell.

Figure 4:
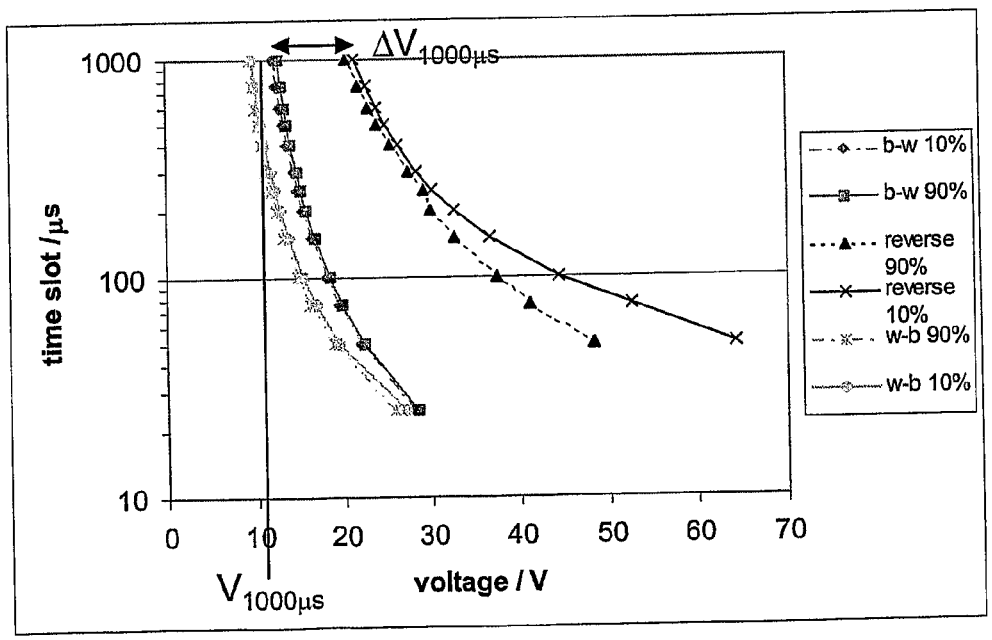
FIG. 4 shows the τ-V curve for the LC mixture MLC-6204-000 at 25° C. (pulse duration or time slot vs. voltage). The switching voltage ($V_{1000\ \mu s}$) and operating window ($\Delta V_{1000\ \mu s}$) used for comparisons are indicated.

The zenithal bistable device and hence the liquid crystal medium have to meet several requirements more or less depending on the specific use of the device. Since there is no consistent theory so far that might predict the physical variables to be optimized, it turned out to be helpful to use a set of (semi-)empirical parameters for evaluating liquid crystal media with respect to their usefulness in zenithal bistable nematic devices. These are illustrated in the so-called τ-V curve for switching voltages of pulse duration τ and for 10 and 90% switching levels with opposite polarities (see FIG. 4) for a liquid crystal mixture of the prior art, namely MLC-6204-000 of Merck KGaA, Darmstadt, Germany.

Firstly, in order to minimize power consumption, to allow more flexibility with the addressing of the device's picture elements and to remain within the limits of standard commercial electronic drivers and associated components, a low switching field and correspondingly a low operating voltage is desirable for switching from one bistable state to the other. The following applies to either the VAN (without a quarter-wave plate) or TN modes when viewed in transmission between crossed polarisers. For material comparison one can determine the switching field E for a pulse (usually a 100 μs or 1000 μs pulse duration) from the switching voltage V that gives a transmission change from, e.g., 0 to 90% transmission (black-to-white; B-W or C-D) for a particular liquid crystal mixture in a given test cell providing zenithal bistability. (In general, one can also use the 100 to 10% transmission change transition of white-to-black, W-B or D-C, where the switching field of which may be higher or lower than the B-W transition depending on the grating's shape and dimensions.) For practical reasons, the average of both the black-to-white transition and the white-to-black transition may be used as in the present specification. In order to take into account the electric field effect of the grating (dependent on the relative permittivities of the liquid crystal and the grating, the grating shape and the cell gap) the value of E actually measured is corrected to distinguish the field just across the liquid crystal again for comparison purposes giving the corrected switching field $E_{LC@1000\,\mu s}$ for a 1000 μs pulse. Here, an additional estimated factor of 1.5 μm is added to the cell gap d when calculating the field just across the liquid crystal:

$$E_{1000\,\mu s} = V_{1000\,\mu s}/d \text{ and } E_{LC@1000\,\mu s} = V_{1000\,\mu s}/(d+1.5)$$
where d is in μm.

Multiplying $E_{LC@1000\,\mu s}$ with optimum cell gap $d_{opt}$ gives the operating voltage $V_{opt}$ corresponding to the optimum cell gap for a 1000 μs pulse for just the liquid crystal. $E_{LC@1000\,\mu s}$ and so $V_{opt}$ depend on the liquid crystal medium used. Here, the optimum cell gap is considered for the VAN-HAN mode of FIG. 3a) but comparisons can also be made for the single polariser HAN-TN mode. If the hybrid state is to act as a quarter-wave plate, the optimum cell gap can be approximated by $d_{opt}=(\lambda/2\Delta n)+0.4$ (in μm) with λ=0.555 μm and Δn being the optical anisotropy of the liquid crystal medium, and the additional factor of 0.4 μm is included as this has been found to give the best optical performance for the gratings currently used. The modified 1st minimum condition for the two polariser HAN-TN mode is then $d_{opt}=(\lambda\sqrt{3}/2\Delta n)+0.4$. As mentioned earlier, the defect state pretilt can be increased to permit larger cell gaps without material improvements but the viewing angle is poorer (and the necessary cell gap may still be much less than 5 μm in some cases). It is desirable to have the defect state pretilt less than 20°.

The second empirical parameter that might be taken into account is the operating window $\Delta V_{opt}$ corresponding to the optimum cell gap. It describes the effect of reverse switching: When applying a pulse with a given time slot of, e.g. 400 μs or 1000 μs, and a defined pulse polarity, e.g. B-W, one observes the desired switching at a specific value of the switching field and a further reverse switching (e.g. W-B in this case) which is not induced by a pulse of inverse polarity but by a pulse of the same polarity at an increased switching field. For technical purposes, obviously said operating window ought to be as wide as possible to permit more flexibility of the driving schemes used and particularly in relation to achieving good greyscale operation (see J. C. Jones, S. M. Beldon and E. L. Wood, "Greyscale in Zenithal Bistable LCD: The Route to Ultra-low Power Colour Displays", seminar talk on the ASID meeting 2002 of the Society for Information Display, Singapore, September 2002. In the example disclosed in this paper for a sub-divided grating, the regions have pitches of 0.6 μm, 0.71 μm, 0.81 μm and 0.9 μm and the switching threshold variation across the bistable window was 6V. Therefore, to achieve the maximum number of such error-free greyscale levels the operating window has to be greater than 6V, meaning $\Delta E_{LC@1000\,\mu s}$ should be greater than ~1.5V/μm but preferably greater than 5V/μm). The corresponding field can be represented by $\Delta E_{LC@1000\,\mu s}$, that is the corrected difference between the 90% reverse switching field and the 90% B-W switching field for a 1000 μs pulse:

$$\Delta E_{1000\,\mu s} = \Delta V_{1000\,\mu s}/d \text{ and } \Delta E_{LC@1000\,\mu s} = \Delta V_{1000\,\mu s}/(d+1.5)$$
where d is in μm.

Taking into account the optimum cell gap $d_{opt}$ by multiplying with $\Delta E_{LC@1000\,\mu s}$ eventually gives the operating window $\Delta V_{opt}$ ($d_{opt}\Delta E_{LC@1000\,\mu s} = \Delta V_{opt}$).

A further parameter of great importance is the clearing point $T_{NI}$ of the liquid crystal medium describing the temperature at which the nematic mixture becomes isotropic. For many technical purposes and for increasing the variability of electrooptical devices utilizing zenithal bistability (and so the possible applications), liquid crystal media having a high clearing point, preferably of at least 70° C., more preferred at least 80° C. or more, are desired.

Still another parameter, the optical response time $\tau_{opt}$ corresponding to the optimum cell gap, describes how fast the liquid crystal medium changes between stable states upon application of an electric pulse. It can be determined by measuring the response time τ for the 10-90% B-W transition, for example using a 100 μs or a 1000 μs pulse, in the actual test cell; then, in order to normalize the experimental values, τ is multiplied by $(d_{opt}/d)^2$ giving $\tau_{opt}$ (with $d_{opt}$ being the optimum cell gap as calculated above for $V_{opt}$ and d being the actual cell gap of the test cell used). The W-B transition is much faster (less than 1 ms) and so indeed the B-W response time is of most importance when assessing the properties of the liquid crystal medium used. The smaller $\tau_{opt}$ the faster the optical response of the liquid crystal medium. A small $\tau_{opt}$ (of about 60 ms or, preferably, less than about 35 ms) may be desirable for certain electrooptical applications.

A further parameter being of some relevance for reflective and transflective bistable nematic devices is the birefringence Δn of the liquid crystal mixture used. Due to the correlation between Δn and the cell gap d, Δn needs to meet specific requirements if displays having a practically useful cell gap of about 5 μm are employed. (A much smaller cell gap, for example of less than 3 μm, is not desired due to practical manufacturing reasons.) With regard to the two-polariser reflective mode (see, e.g., FIG. 3b)) and to the TN 1st minimum condition as given previously, Δn is desirably of about 0.11 or less, particularly when a lower defect state pretilt at the grating is favoured for improved optical performance.

Those liquid crystal media the use of which in zenithal bistable devices have been described in the prior art do not meet all the parameter requirements outlined above. Even liquid crystal mixture MLC-6204-000 (available from Merck KGaA, Darmstadt, Germany) that has been used in zenithal bistable devices as the preferred medium (WO 01/40853, Example 6; J. C. Jones, G. Bryan-Brown, E. Wood, A. Graham, P. Brett and J. Hughes, "Novel bistable liquid crystal displays based on grating alignment", in "Liquid Crystal Materials, Devices, and Flat Panel Displays", R. Shashidhar, B. Gnade, Eds., Proceedings of SPIE Vol. 3955 (2000), 84) has a clearing point $T_{N1}$ of only 62.4° C. that is rather low for use in zenithal nematic bistable device for many possible applications, especially portable ones. Furthermore, it has a rather high $V_{opt}$ and a rather small $\Delta V_{opt}$.

The present invention therefore encounters the problem to provide a liquid crystal composition that is suitable for use in a bistable liquid crystal device and especially in a reflective or transflective zenithal bistable nematic device and has an improved set of properties.

The problem is solved by a liquid crystal composition for use in a bistable liquid crystal device, said device being preferably a zenithal nematic liquid crystal device, whereby said composition comprises a component (π) said component (π) containing one or more compounds having a phenyl ring of formula A

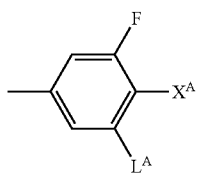

whereby
$X^A$ is F, Cl, $SF_5$, NCS, or a $C_1$ to $C_8$ alkanyl, alkenyl or alkoxy radical substituted with at least one F atom; and
$L^A$ is H or F.

A further subject matter of this invention is a bistable liquid crystal device comprising
  two outer substrates which, together with a frame, form a cell;
  a liquid crystal composition present in said cell;
  electrode structures with alignment layers on the inside of said outer substrates whereby at least one alignment layer comprises an alignment grating that permits the liquid crystal composition to adopt at least two different stable states whereby the assembly of said electrode structures with said alignment layers being such that in a first driving mode a switching between the said at least two different stable states is achieved by applying suitable electric signals to said electrode structures;
  whereby said liquid crystal composition is said liquid crystal composition as described above and below and that comprises said component (π).

In particular, said bistable liquid crystal device is a zenithal bistable nematic liquid crystal device in which said electrode structures with alignment layers on the inside of said outer substrates have at least one alignment layer that comprises an alignment grating that permits the compounds of said liquid crystal composition to adopt at least two different stable states with different pretilt angles in the same azimuthal plane whereby the assembly of said electrode structures with said alignment layers being such that a switching between the said at least two different stable states is achieved by applying suitable electric signals to said electrode structures.

The bistable liquid crystal device according to the invention may be, for instance, a transmissive, reflective or transflective display; it may even be of a more complex device construction as it is known in the art. It is particularly preferred that the bistable liquid crystal device according to the invention is a reflective or transflective display and especially a reflective or transflective zenithal bistable nematic liquid crystal display.

Furthermore, it has surprisingly been found that the liquid crystal composition for bistable liquid crystal devices according to the present invention are not only suitable for conventional passive matrix (PM) (or direct or multiplex addressed) bistable liquid crystal devices but for bistable liquid crystal devices that may be operated over an active matrix (AM), particularly over an AM addressing with a TFT (thin film transistor) array. (TFT-AM displays are well known to those skilled in the art and generally described in, e.g., the Merck brochure "Flüssigkristalle für Aktivmatrix-Flachbildschirme" [Liquid Crystals for Active Matrix Flat Panel Displays], M. Heckmeier, G. Lüssem, K. Tarumi, W. Becker, Merck KGaA, Darmstadt, Germany, 2003.) Moreover, this further allows the use of the liquid crystal composition according to the present invention in a liquid crystal device that is operated and/or operable in a so-called "dual mode" one of which being a bistable mode and the other one being a monostable mode. Therefore, a further subject matter of the present invention is a bistable liquid crystal device that comprises electrode structures the assembly of which allowing the switching between said at least two different stable states in said first driving mode (i.e. the bistable mode) and a switching of said liquid crystal composition in a second driving mode that is the monostable mode. This device operated and/or operable in the dual mode will be described in greater detail somewhere below in this specification. (It should be recognized that said bistable mode may be addressed by a passive matrix (PM) or direct or multiplex addressing or even an active matrix (AM). In the context of the present invention it is preferred that both said bistable mode and said monostable mode of said dual mode are driven by an active matrix (AM) TFT mode.)

It will be acknowledged that the invention is described hereinafter primarily with regard to the use of the liquid crystal composition above in a zenithal bistable nematic liquid crystal device although it may be used in other liquid crystal devices as well, for instance, in bistable liquid crystal devices like azimuthal bistable liquid crystal devices as disclosed, inter alia, in WO 92/00546 and WO 95/22077. Thus, details are given for the zenithal bistable nematic liquid crystal device but can easily be adapted to the requirements of other types of bistable liquid crystal devices.

The cell that is part of the zenithal bistable nematic device according to the invention may be any conventional cell that allows the nematic liquid crystal composition to adopt at least two different zenithal bistable states. Two possible stable states are schematically depicted in FIG. 1. The two different zenithal bistable states are characterized by two different pretilt angles that are adopted by the liquid crystal molecules in the same azimuthal plane. The cell comprises a frame and two outer substrates or plates and has electrode structures with alignment layers on the inside of said substrates. At least one of these alignment layers has an zenithal alignment grating known to those skilled in the art and as described, for instance, in WO 97/14990, WO 01/40853, WO 02/08825, and J. C. Jones, et al., Proceedings of SPIE Vol. 3955 (2000), 84.

The electrode structures are assembled with the alignment layer(s) in such a way that (in the case of two stable states) switching from one stable state to the other can be achieved by applying suitable electric signals to the electrode structures thereby applying said electric signals to the liquid crystal composition inside the cell. Commonly, single pulses can be used as such suitable electric signals. Details are known to the artisan and described in WO 97/14990, WO 01/40853, WO 02/08825, J. C. Jones, J. R. Hughes, A. Graham, P. Brett, G. P. Bryan-Brown, IDW '00 (2000), 301, J. C. Jones, et al., Proceedings of SPIE Vol. 3955 (2000), 84, and E. L. Wood, P. J. Brett, G. P. Bryan-Brown, A. Graham, R. M. Amos, S. Beldon, E. Cubero and J. C. Jones, "Large Area, High Resolution Portable ZBD Display", SID 02 Digest (2002), 22-25.

The substrate opposite to the substrate having the grating alignment layer may have a homeotropic alignment due to suitable surface treatment (see FIG. 2a)). Switching upon application of an electric pulse occurs from the high tilt or vertically aligned state to the low tilt or hybrid aligned state. This switch gives a black-to-white (B-W) change if the cell is placed between crossed polarisers (at 45° to the grating direction), with the brightest white state obtained when the vertically aligned state acts as a half-wave plate (d$\Delta$n=$\lambda$/2). This switching mode is called VAN mode. Zenithal bistable devices utilizing the VAN mode are very insensitive to cell gap variations. They require additional optical compensators to achieve wide viewing angles. A second switching mode of zenithal bistable devices is called TN mode (see FIG. 2b)): The substrate opposite to the substrate having the grating alignment layer has a alignment layer, usually of rubbed polyimide, causing planar alignment of the liquid crystal molecules on said substrate. This in turn causes the twisting of the liquid crystal director around their axis perpendicular to the substrates across the cell. Switching upon application of an electric pulse now occurs from the low tilt or twisted aligned state to the high tilt or hybrid-aligned state. This switch gives a black-to-white (B-W) change if the cell is placed between parallel polarisers and using the TN $1^{st}$ minimum condition accounting for the influence of the ordinary refractive index of the hybrid state. Due to a high normal incidence contrast ratio additional optical compensators for achieving wide viewing angles are not required in a transmissive display. Therefore the TN mode is preferred for some of the technical applications of zenithal bistable nematic devices.

It is also possible to build up zenithal bistable reflective (or transflective) displays that are preferred embodiments of the present invention. FIG. 3a)) depicts a reflective zenithal bistable nematic device in the VAN-HAN mode utilizing a single polariser (as explained above with regard to FIG. 3a)). FIG. 3b) depicts a reflective zenithal bistable device in the HAN-TN mode utilizing two polarisers one on each substrate of the cell (as explained above with regard to FIG. 3b)).

For details of the build-up of zenithal bistable devices, also with regard to the polarisers used, it is referred to WO 97/14990, E. L. Wood, G. P. Bryan-Brown, P. Brett, A. Graham, J. C. Jones, and J. R. Hughes, SID 00 (2000), 124, and E. L. Wood, P. J. Brett, G. P. Bryan-Brown, A. Graham, R. M. Amos, S. Beldon, E. Cubero and J. C. Jones, "Large Area, High Resolution Portable ZBD Display" SID 02 Digest (2002), 22-25.

With regard to the addressing of the bistable liquid crystal device, especially the zenithal bistable nematic liquid crystal device, in which the liquid crystal composition described hereinbefore and hereinafter is used according to the invention, the conventional passive matrix (PM) addressing is usually sufficient for displaying information that is updated only infrequently. However, there are several reasons why it might be desirable to operate a bistable liquid crystal display over an active matrix. When displaying true video (i.e. fast changing images) the size of the display (i.e. the number of rows) for a PM device is limited by the time it takes to address all of the lines sequentially, and this ought to be <16.7 ms or else the updating can be observed by the human eye. This means that if, for instance, the line address time were 100 µs then the maximum number of lines would be limited to 167 (16.7 ms/100 µs). However, one way to address a very large panel displaying video-rate information would be to use AM addressing with a TFT array.

This becomes particularly important when the optical response of the liquid crystal composition in the display driven in the bistable mode is above about 16.7 ms. Then the bistable mode alone is not capable of displaying video-rate information. As most PM bistable liquid crystal mixtures have longer response times than this, a way around the problem is to operate the device in what is known as the dual-mode format. This essentially means that for static or infrequently updated images the display would be operated in the bistable mode in the usual way but, for instance, if the geometry used is the TN one (or the VAN one) then the display could also be operated in the standard monostable TFT-TN mode (or the TFT-VAN mode, respectively) for fast changing images. It should be recognized that said bistable mode may be addressed by a passive matrix (PM) or direct or multiplex addressing or an active matrix (AM). In the context of the present invention it is preferred that both said bistable mode and said monostable mode of said dual mode are driven by an active matrix (AM) TFT mode.

However, this implies that the liquid crystal composition used in the device operated and/or operable in the dual-mode format must accomplish specific requirements of both the "fast switching" monostable TFT mode and the somewhat "slower switching" bistable liquid crystal mode at the same time.

It has been found by the inventors that the liquid crystal composition for use in bistable liquid crystal devices exhibit an improved set of parameters making the composition suitable for the conventional bistable mode (especially the zenithal bistable nematic mode) as well as the dual-mode format. These parameters are, inter alia, operating voltage and, especially, clearing point and voltage holding ration (VHR). The operating voltage is in a range useful for operating a zenithal bistable nematic liquid crystal device either in the conventional or a dual mode. It should be noticed that, for instance, the clearing point of the liquid crystal compositions for use in the zenithal bistable nematic devices of the invention is significantly higher than the clearing point of liquid crystal mixtures previously used in zenithal bistable nematic devices. Moreover, the birefringence can be adjusted appropriately for transmissive, reflective and transflective displays. What is more, the operating window ($\Delta V_{opt}$) is found to be much broader (it is generally >3 V/µm) than in liquid crystal compositions for use in bistable liquid crystal devices previously known, and thus reverse switching does not impose any practically relevant problems here. Furthermore, in certain embodiments of the invention the optical response time $\tau_{opt}$ is decreased significantly. The liquid crystal compositions according to the present invention also show an extended nematic phase range.

At the same time the VHR of the liquid crystal composition of the invention is high enough for use of AM addressing with a TFT array. This is necessary because in a standard active matrix (AM) LCD, each pixel is addressed independently by a thin film transistor (TFT) (or sub-pixel when each pixel consists of more than one colour). The transistor charges a pixel and acts electrically as a capacitor while all the other rows of the matrix are addressed. During the remainder of the frame time (typically 16.7 ms corresponding to a frequency of 60 Hz) the voltage drop across an addressed pixel must be as small as possible to avoid any change in contrast. The VHR is used to gauge this and is defined as the ratio of the root mean square (RMS) voltage during a single frame to the initial voltage value ($V_0$), and is usually expressed as a percentage:

$$VHR = \frac{1}{V_0} \left| \frac{1}{T_f} \int_0^{T_f} (V_0 \exp^{-t/RC})^2 dt \right|^{1/2}$$

where $T_f$ is the frame time and RC is the time constant. VHR's >90% and especially >95% over the temperature operating range (and >90% under severe UV loads) are usually required and achieved by the liquid crystal composition described and claimed herein. Some specific embodiments of the present invention even show VHR values of >97% and especially of ≧98%. (The measurement of VHR's is usually performed according to proceedings known from the literature [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)]). For the purpose of this specification, however, the term "VHR" refers hereinafter to the voltage holding ratio over the temperature operating range, unless specified otherwise.

Figure 5:
FIG. 5 illustrates the dual mode LCD operation principle: A laptop display is displaying a proportion of static text and a proportion with a moving image. The static text operates in the bistable mode, the moving image operates in a monostable TFT-LCD mode.

Conventional bistable liquid crystal devices have been discussed in detail hereinbefore with specific regard to zenithal bistable nematic liquid crystal devices. Devices utilizing a dual-mode format have also been known and described in the literature, for instance in WO 02/29775 A1 and WO 02/29776 A1 (both utilizing bistable chiral nematic liquid crystal material) as well as in WO 03/044763 A1. In general, such a dual-mode format can be described as follows:

In information display applications, such as notebook computers utilising the Microsoft Windows™ operating system, or in the emerging field of interactive media, it is possible that the liquid crystal display may be expected to simultaneously display both a static and a moving image, with the majority of the display displaying static text and a small window displaying video. The diagram in FIG. 5 below is a graphical representation of this. Whereas it is possible to adopt such a visual appearance to the display in a conventional AM liquid crystal display, it is necessary to constantly update the entire display, as there is no inherent bistability. In the dual-mode display, the portion of the display displaying static text could be driven using an addressing scheme that utilises the bistable mode, and the portion of the display displaying a video image could be driven utilising an addressing scheme that utilises the conventional monostable mode. Thus, in principle each and every individual picture element (pixel) of the display can be driven in either mode. The combination of the inventive liquid crystal mixture concept, the bistability enabling surface, and appropriate drive schemes and electronics enable this.

In one embodiment of the present invention the liquid crystal composition for bistable liquid crystal devices, especially zenithal bistable nematic liquid crystal devices, is essentially free of compounds having a terminal ring to which at least one CN substituent is attached directly or indirectly. This means that liquid crystal compositions according to the invention may comprise besides said component (π) further compounds but should not comprise any substantial amounts (i.e. not more than about 1 to 2 weight % of the total weight of the mixture) of compounds with an end ring substituted with at least one cyano group (i.e. direct attachment) or a group that itself is substituted with at least one cyano group (e.g. a CN substituted alkyl radical) (i.e. indirect attachment). Preferably, the liquid crystal composition of this embodiment is completely free of such cyano substituted compounds. In this embodiment, VHR is sufficiently high, usually above 95%, preferably above about 97% and especially preferably above about 98%. The further compounds comprised in the bistable liquid crystal composition of this specific embodiment are, for instance, selected from those of formulas III to XIV as described in more detail elsewhere in this specification.

In still another preferred embodiment of the invention said component (π) is comprised in the liquid crystal composition according to the invention in an amount of at least 60 weight % or more (based on the total weight of the composition), especially in an amount of at least 80 weight %. (Since the liquid crystal composition of this embodiment may or may not comprise further compounds not encompassed by component (π), it should be noted that compounds having a terminal ring bearing at least one direct or indirect-CN substituent may or may not be among these further compounds. However, it is preferred that the liquid crystal composition according to this embodiment of the present invention is essentially free of cyano substituted compounds, i.e. the composition does not contain more than about 1 to 2 weight % (based on of the total mixture) of CN substituted compounds. It is even more preferred that the compositions of this embodiment are completely free of such cyano substituted compounds.)

The liquid crystal composition according to the present invention may consist essentially or completely of said component (π) (i.e. 100 weight % of the mixture). It is, however, especially preferred that further compounds besides component (π) are comprised by the liquid crystal composition of the invention and that component (π) is contained in an amount of up to 99 weight %, more preferred in an amount of up to 95 weight %.

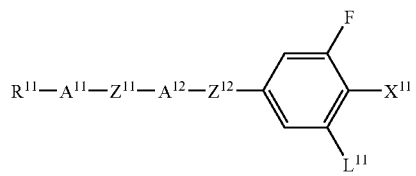

I

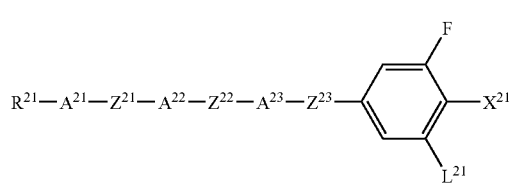

II

-continued

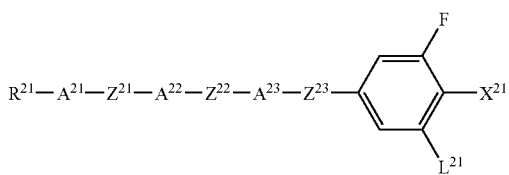
II whereby
R$^{11}$ and R$^{21}$ are independently of each other C$_1$-C$_{15}$ alkyl which is unsubstituted or mono- or poly-substituted with halogen and in which one or more of the CH$_2$ groups may be replaced independently of each other by —O—, —S—, —CH=CH—, —C≡C—, —CO—O—, —OC—O— such that there are no hetero atoms adjacent to each other;
Z$^{11}$, Z$^{12}$, Z$^{21}$, Z$^{22}$, Z$^{23}$ are independently of each other a single bond, —CO—O—, —O—CO—, —CH$_2$O—, —OCH$_2$—, —CF$_2$O—, —OCF$_2$—, —CH$_2$CH$_2$—, (—CH$_2$CH$_2$—)$_2$, —CF=CF—, —CF$_2$CF$_2$—, —CH$_2$CF$_2$—, —CF$_2$CH$_2$—, —CH=CH— or —C≡C—;
X$^{11}$ and X$^{21}$ are independently of each other is F, Cl, SF$_5$, NCS, or a C$_1$ to C$_8$ alkanyl, alkenyl or alkoxy radical substituted with at least one F atom;
L$^{11}$ and L$^{21}$ are independently of each other H or F; and
A$^{11}$, A$^{12}$, A$^{21}$, A$^{22}$ and A$^{23}$ are independently of each other one of the following rings:

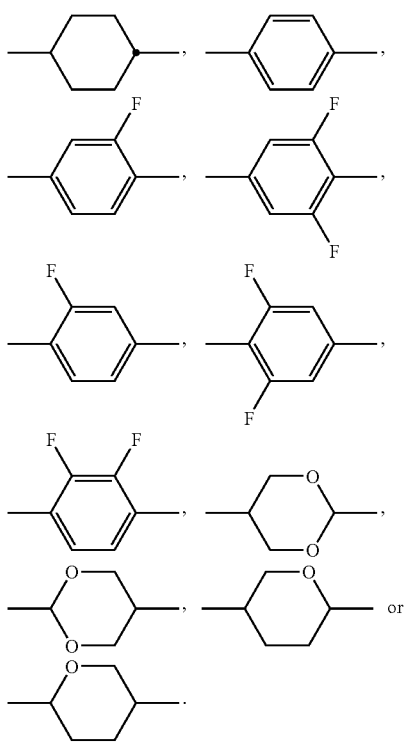

With regard to compounds of formula I it is more preferred that
R$^{11}$ is a C$_1$ to C$_8$ alkanyl, alkenyl or alkoxy radical unsubstituted or substituted with at least one F atom, especially an unsubstituted and straight-chain alkanyl or alkenyl radical with 2, 3, 4, 5, 6 or 7 carbon atoms;
L$^{11}$ is H or F, especially F;
X$^{11}$ is F or Cl, especially F;
Z$^{11}$ and Z$^{12}$ are a single bond, —CF$_2$O— or —CO—O— whereby at least one of Z$^{11}$ and Z$^{12}$ is a single bond;

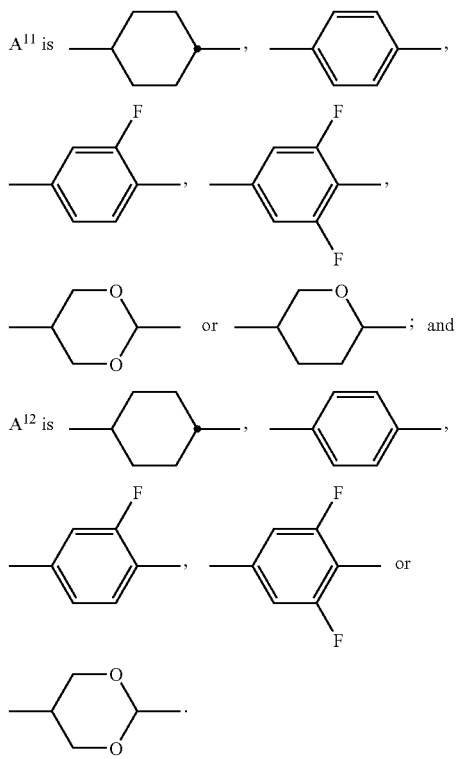

Preferred subformulas of formula I are inter alia:

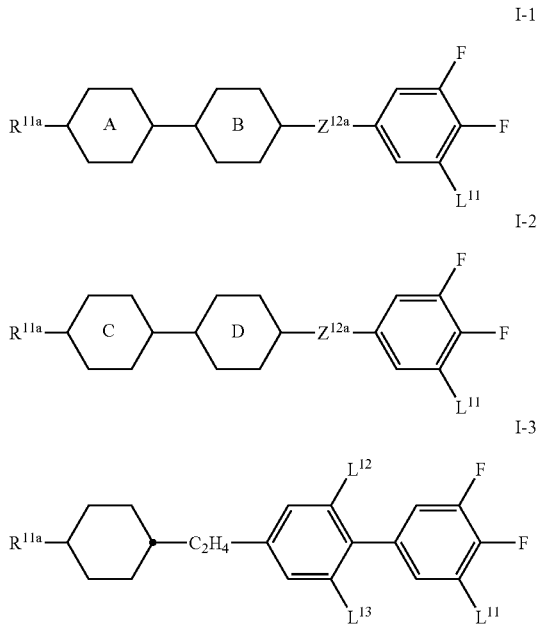

-continued

I-4

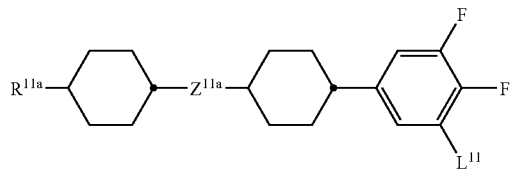

I-5

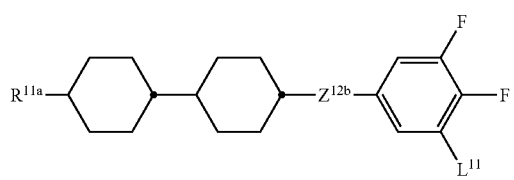

wherein
$R^{11a}$ is defined as $R^{11}$ in formula I and preferably an unsubstituted and straight-chain or branched alkanyl, alkoxy or alkenyl radical with up to 8 carbon atoms;
$Z^{11a}$ and $Z^{12b}$ are independently of each other —$C_2F_4$—, —CF=CF—, —$C_2H_4$—, —$OCH_2$— or —$CH_2O$—;
$Z^{12a}$ is a single bond, —$CF_2O$— or —CO—O—;
$L^{11}$, $L^{12}$ and $L^{13}$ are independently of each other H or F;

is a 1,4-phenylene or trans-1,4-cyclohexylene ring;

is a 1,3-dioxan-2,5-diyl or tetrahydropyran-2,5-diyl ring; and

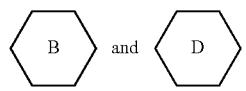

are independently of each other

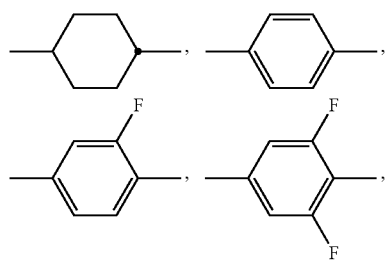

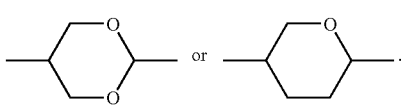

Preferably, compounds of formula I are selected from sub-formulas I-1 and I-2.

Some specific compounds of preferred compounds of formula I are the following ones:

I-A

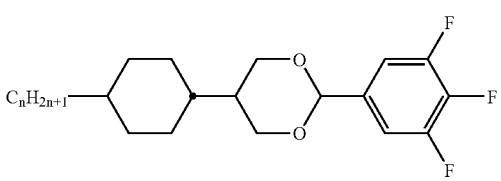

I-B

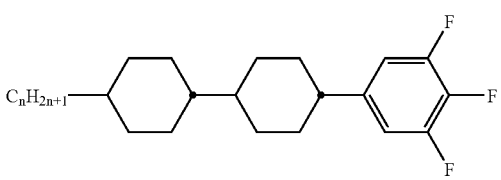

I-C

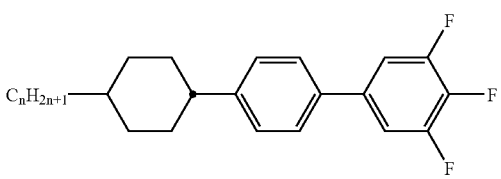

I-D

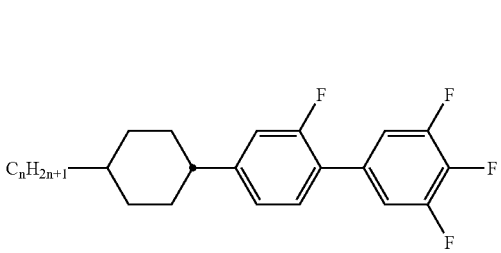

I-E

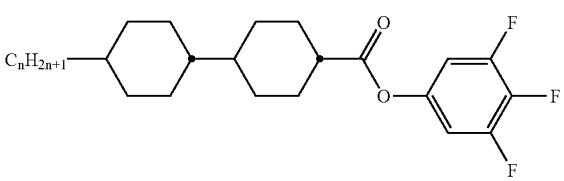

I-F

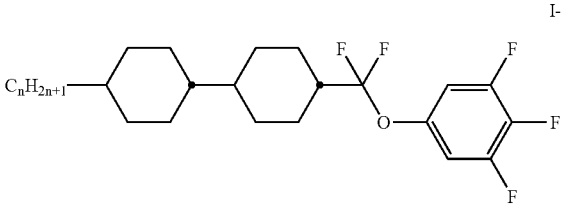

I-G

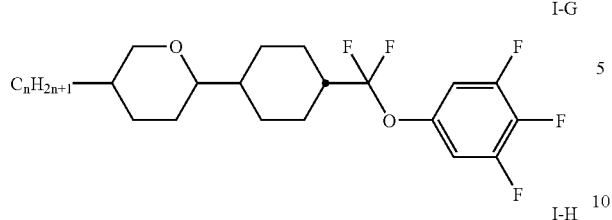

I-H

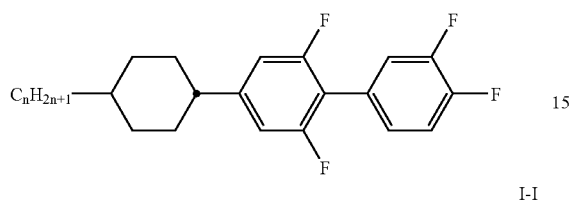

I-I

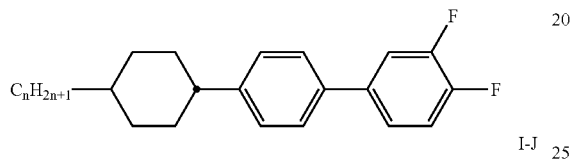

I-J

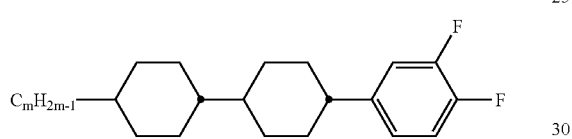

with n and m being independently of each other 2, 3, 4, 5, 6 or 7 and $C_nH_{2n+1}$— and $C_mH_{2m-1}$— both being preferably straight-chain radicals. It is especially preferred that n is 2, 3 and 5, while m is 2 or 3.

While liquid crystal compositions for use in bistable liquid crystal devices of the invention comprising compounds of the formulas I-A to I-J usually exhibit values of the birefringence Δn below about 0.11 which in many cases is desirable for reflective and transflective displays, in some other cases it might be useful to have liquid crystal compositions according to the present invention that show higher Δn values. In these cases it is particularly preferred to have compounds of the following formulas included in component (π):

I-K

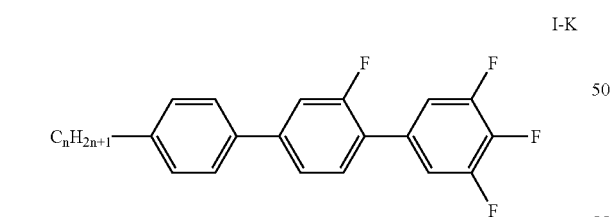

I-L

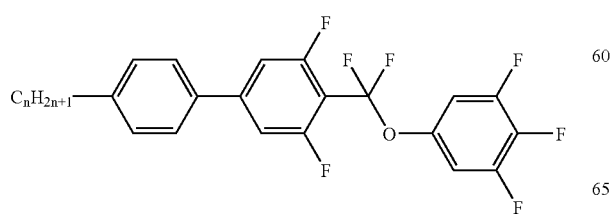

with n being 2, 3, 4, 5, 6 or 7 and $C_nH_{2n+1}$— being preferably a straight-chain radical. It is especially preferred that n is 2, 3 and 5. It should be noted that besides these compounds of formulas I-K and I-L other compounds having a terminal phenyl ring of formula A may or may not be contained in component (π).

Some further compounds of formula I that may be comprised by component (π) of the liquid crystal composition according to the present invention are:

I-M

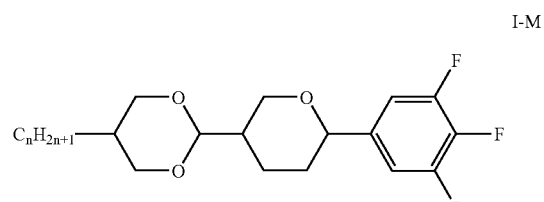

I-N

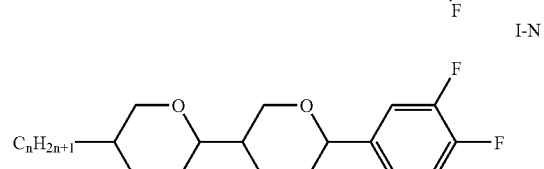

I-O

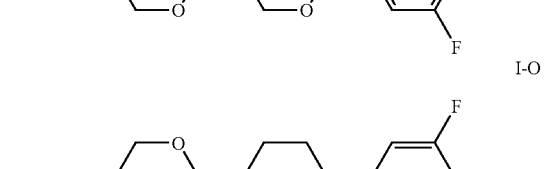

I-P

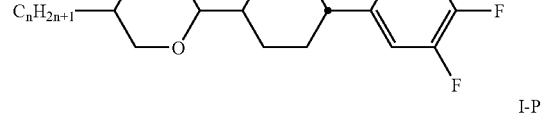

I-Q

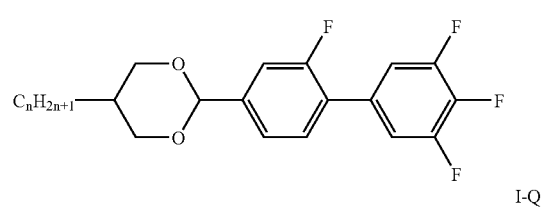

I-R

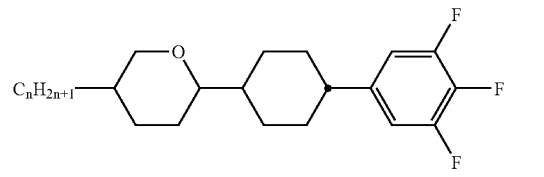

I-S

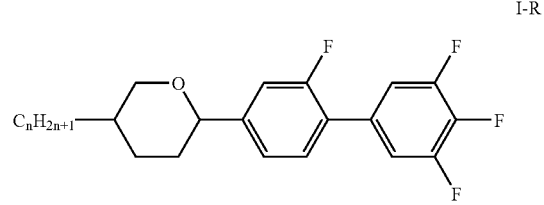

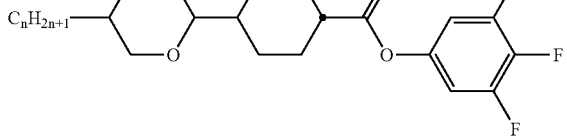

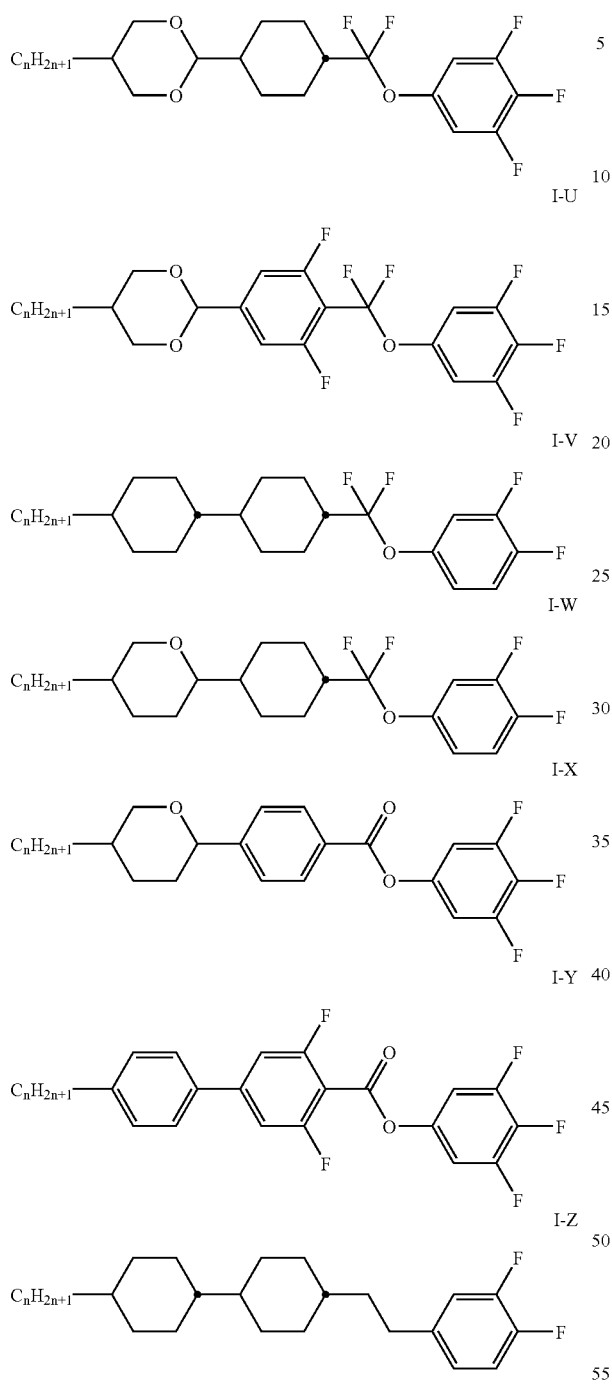

with n being 2, 3, 4, 5, 6 or 7 and $C_nH_{2+1}$— being preferably a straight-chain radical.

With regard to compounds of formula II it is more preferred that $R^{21}$ is a $C_1$ to $C_8$ alkanyl, alkenyl or alkoxy radical unsubstituted or substituted with at least one F atom; especially an unsubstituted and straight-chain alkanyl or alkenyl radical with 2, 3, 4, 5, 6 or 7 carbon atoms;

$L^{21}$ is H or F, especially F;

$X^{21}$ is F or Cl, especially F;

$Z^{21}$, $Z^{22}$ and $Z^{23}$ are each a single bond, —CF$_2$O— or —CO—O— whereby at least two of $Z^{21}$, $Z^{22}$ and $Z^{23}$ are each a single bond;

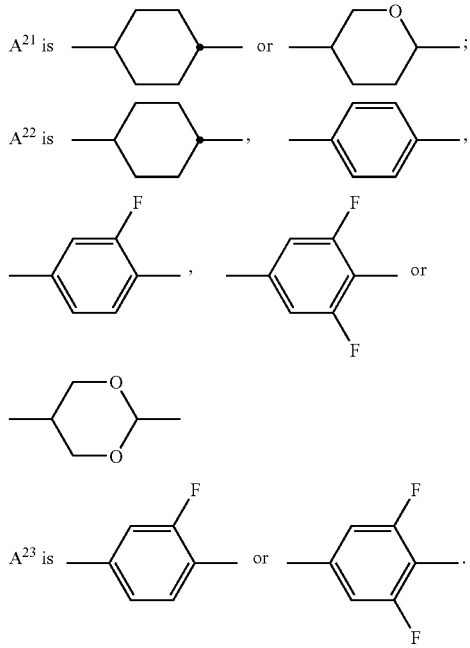

Preferred subformulas of formula II are inter alia:

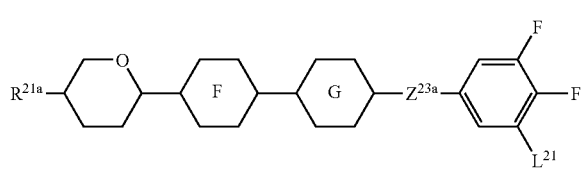

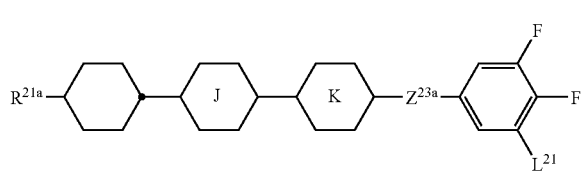

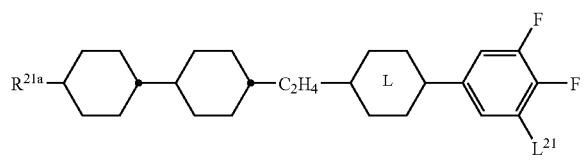

wherein $R^{21a}$ is defined as $R^{21}$ for formula II above and preferably an unsubstituted and straight-chain-or branched alkanyl, alkoxy or alkenyl radical with up to 8 carbon atoms;

$Z^{23a}$ is a single bond, —CF$_2$O— or —CO—O—;

L$^{21}$ is H or F;

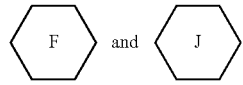

are independently of each other

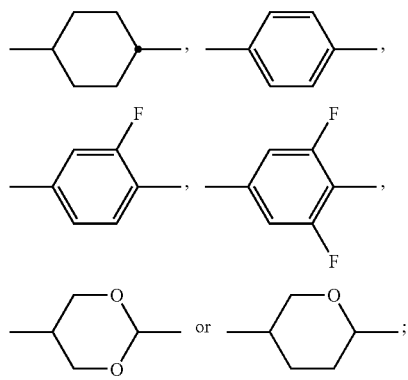

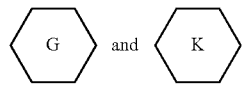

are independently of each other

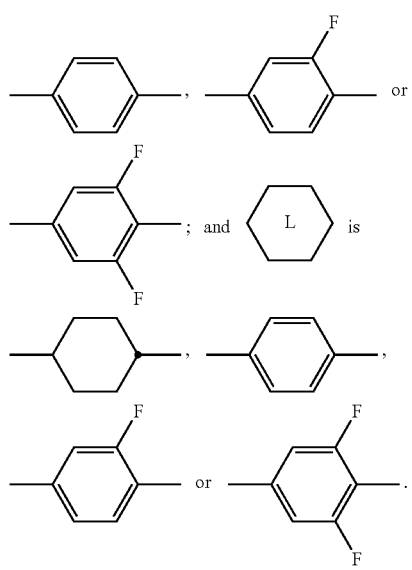

Preferably, compounds of formula II are selected from subformulas II-1 and II-2.

Some specific compounds of preferred compounds of formula II are the following ones:

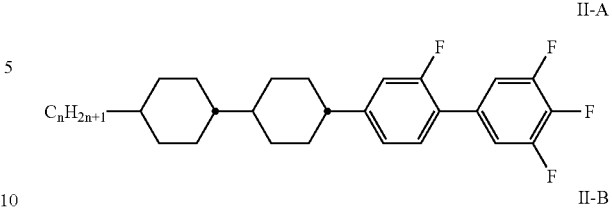
II-A

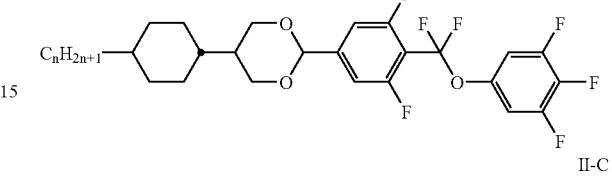
II-B

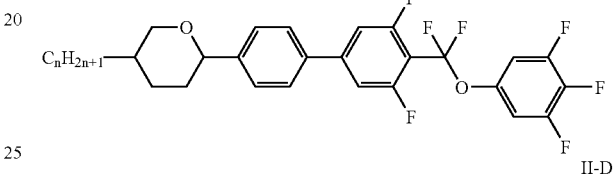
II-C

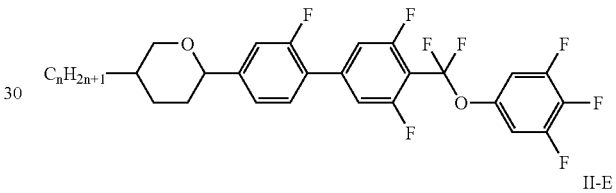
II-D

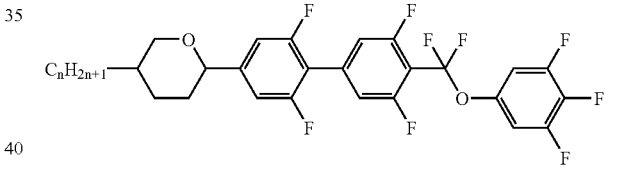
II-E with n being 2, 3, 4, 5, 6 or 7 and $C_nH_{2n+1}$— being preferably a straight-chain radical. It is especially preferred that n is 2, 3 and 5.

Some further compounds of formula II that may be comprised by component (π) of the liquid crystal composition according to the present invention are:

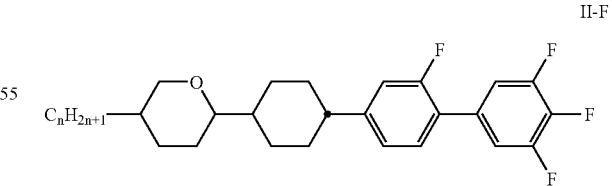
II-F

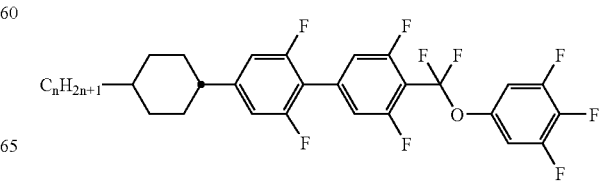
II-G

-continued

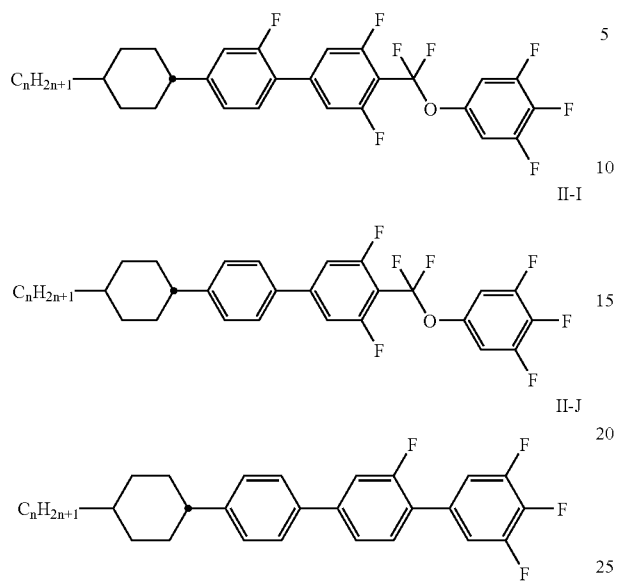

The component (π) of the liquid crystal composition of the instant invention may comprise only compounds of formula I above; in certain embodiments of the invention, however, it comprises only compounds of formula II above. In another group of embodiments of the invention it may comprise compounds of formula I as well as of formula II. In the latter case the weight ratio of compounds of formula I to compounds of formula II is from about 1:10 to about 10:1.

The liquid crystal composition for use in the bistable liquid crystal device according to the invention may comprise further mesogenic or liquid crystalline compounds known in the art. They may be present in order to adjust some of the composition's properties like viscosity, dielectric anisotropy, birefringence and nematic phase range. These compounds are not specifically limited as long as they do not impair the composition's properties with respect to its use in the bistable liquid crystal device.

Preferably, the liquid crystal composition of the present invention comprises one ore more compounds of the following formulas:

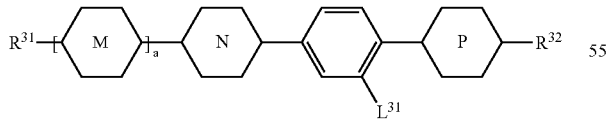

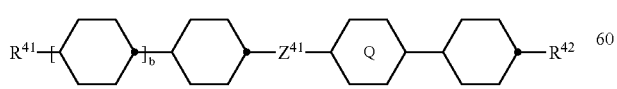

-continued

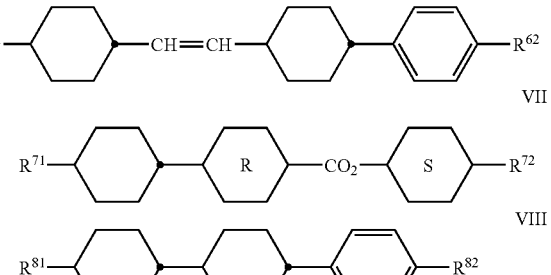

a and b are independently of each other 0 or 1;
$R^{31}$, $R^{32}$, $R^{41}$, $R^{42}$, $R^{51}$, $R^{52}$, $R^{61}$, $R^{62}$, $R^{71}$, $R^{72}$, $R^{81}$ and $R^{82}$ are independently of each other $C_1$-$C_{15}$ alkyl which is unsubstituted or mono- or poly-substituted with halogen and in which one or more of the $CH_2$ groups may be replaced independently of each other by —O—, —S—, —CH=CH—, —C≡C—, —CO—O—, —OC—O— such that there are no hetero atoms adjacent to each other;
$L^{31}$ is H or F;
$Z^{41}$ is —CO—O—, —$CH_2$O—, —O$CH_2$—, —$CF_2$O—, —OC$F_2$—, —$CH_2CH_2$—, —$CF_2CF_2$—, —$CH_2CF_2$—, —$CF_2CH_2$—, —CH=CH— or —C≡C—;

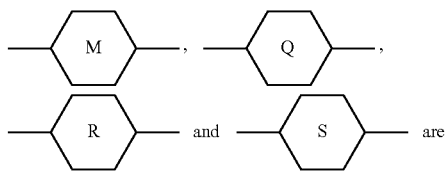

independently of each other

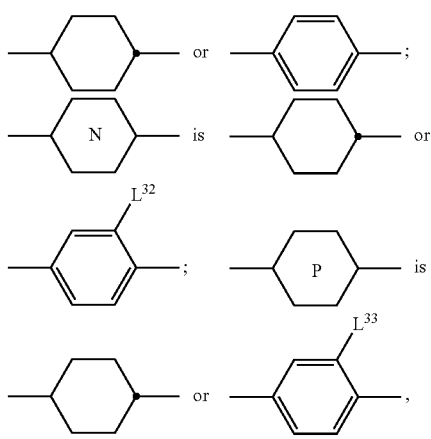

in which
$L^{32}$ and $L^{33}$ are independently of each other H or F.

With respect to formula III it is preferred that a is 1. Preferred compounds of formula III are of the following formulas:

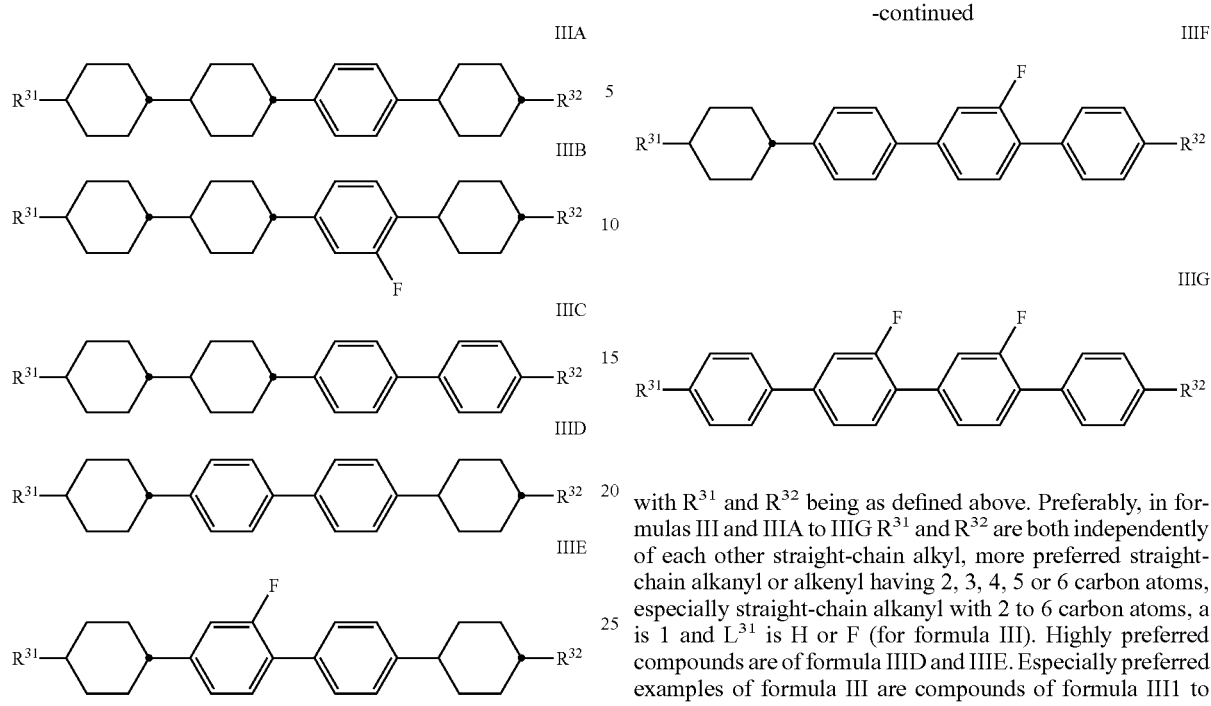

with $R^{31}$ and $R^{32}$ being as defined above. Preferably, in formulas III and IIIA to IIIG $R^{31}$ and $R^{32}$ are both independently of each other straight-chain alkyl, more preferred straight-chain alkanyl or alkenyl having 2, 3, 4, 5 or 6 carbon atoms, especially straight-chain alkanyl with 2 to 6 carbon atoms, a is 1 and $L^{31}$ is H or F (for formula III). Highly preferred compounds are of formula IIID and IIIE. Especially preferred examples of formula III are compounds of formula III1 to III6:

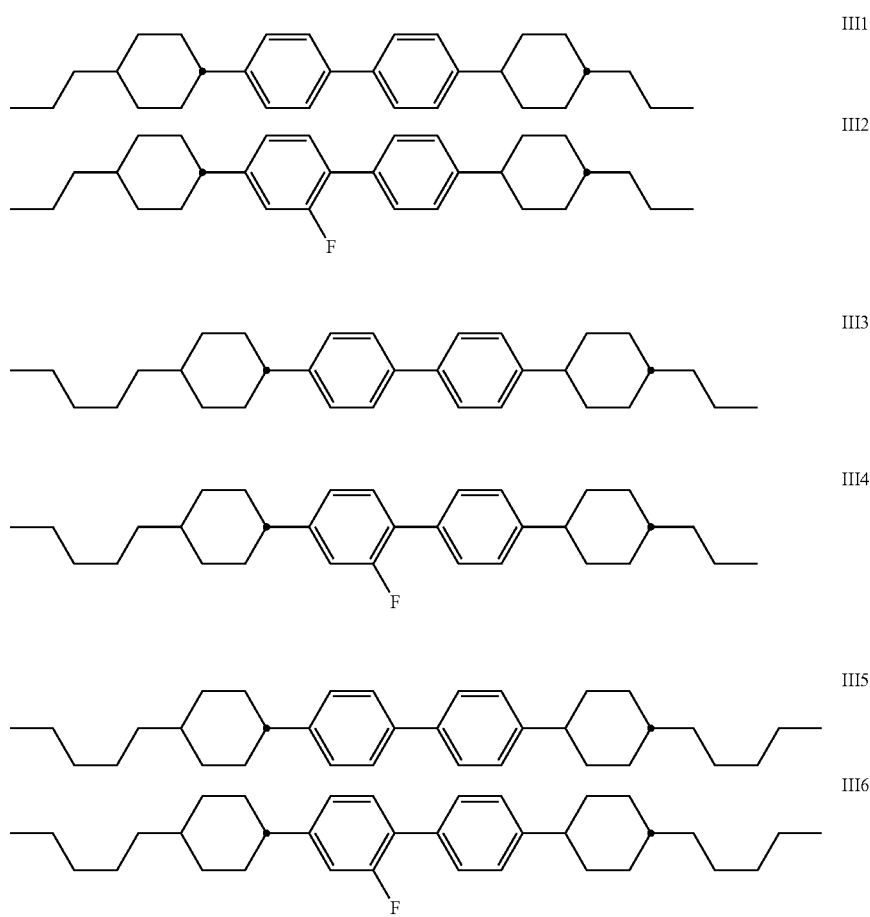

Most preferred compounds of formula III are compounds III2, III4 and III6, and it is especially preferred to have a mixture of all three compounds in the liquid crystal composition.

In some embodiments of the present invention it may also be preferred that a in formula III is zero. Then, preferred compounds of formula III are of the following formulas:

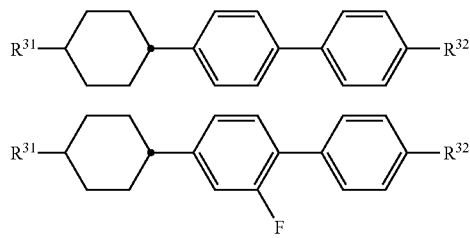

IIIH

IIIJ whereby $R^{31}$ and $R^{32}$ are as defined above and preferably independently of each other straight-chain alkyl, more preferred straight-chain alkanyl or alkenyl having 2, 3, 4, 5 or 6 carbon atoms, even more preferred straight-chain alkanyl with 2 to 6 carbon atoms. Especially, $R^{31}$ is n-propyl or n-pentyl and $R^{32}$ is ethyl.

Preferred compounds of formula IV are of the following compounds:

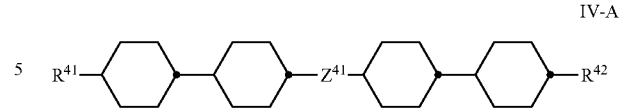

IV-A

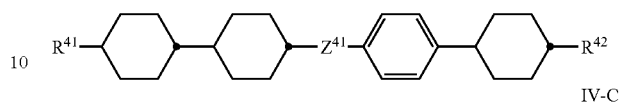

IV-B

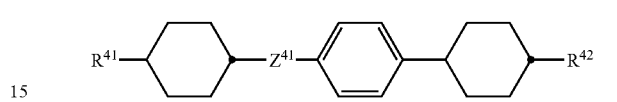

IV-C

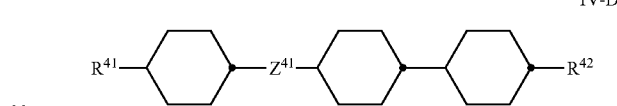

IV-D with $R^{41}$, $R^{42}$ and $Z^{41}$ being as defined above; $Z^{41}$ is preferably —CO—O— or, in case of formula IVD, —OCH$_2$—. $R^{41}$ and $R^{42}$ are both independently of each other straight-chain alkyl, more preferred straight-chain alkanyl or alkenyl having 2, 3, 4, 5 or 6 carbon atoms, especially straight-chain alkanyl with 2 to 6 carbon atoms. Compounds of formula IVB are more preferred. Especially preferred examples of formula IV are compounds of formulas IV1 to IV3 as well as of formulas IV4 and IV5 and of formulas IV6 to IV8:

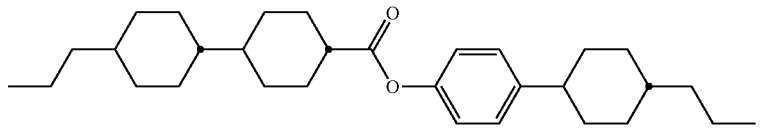

IV1

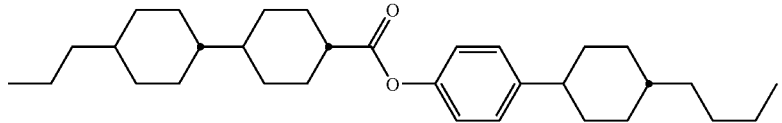

IV2

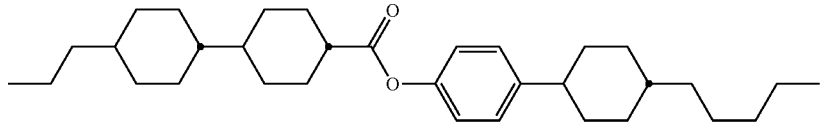

IV3

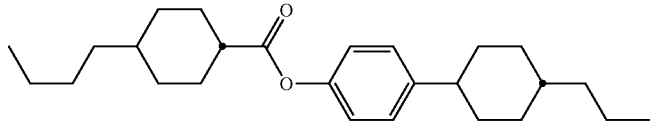

IV4

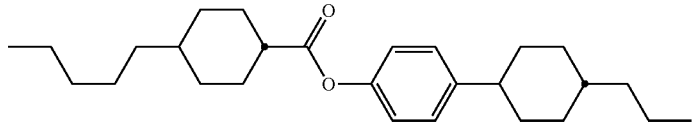

IV5

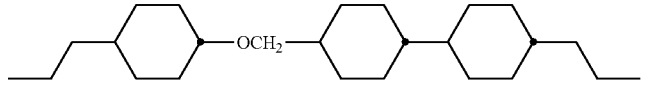

IV6

-continued

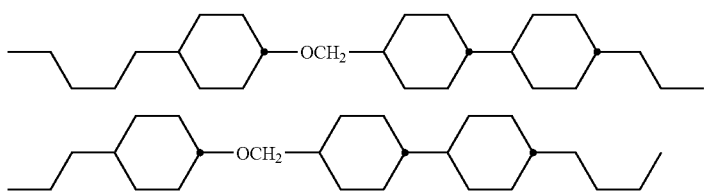

It is especially preferred to have a mixture of compounds IV1, IV2 and IV3 in the liquid crystal composition.

Preferably, in formula V above $R^{51}$ is straight-chain alkyl, more preferred straight-chain alkanyl or alkenyl having 2, 3, 4, 5 or 6 carbon atoms, especially straight-chain alkanyl with 2 to 6 carbon atoms, and $R^{52}$ is straight-chain alkyl or, more preferred, alkoxy having 1, 2, 3 or 4 carbon atoms. Especially preferred examples of formula V are compounds of formula V1 to V6:

V1
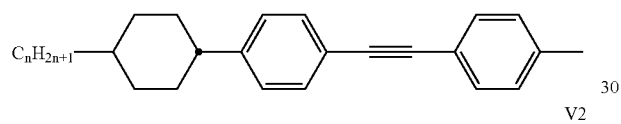

V2
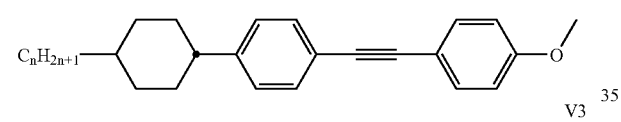

V3
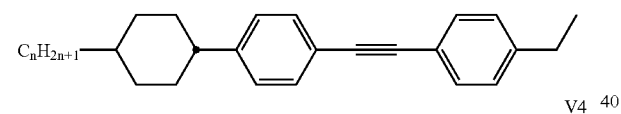

V4
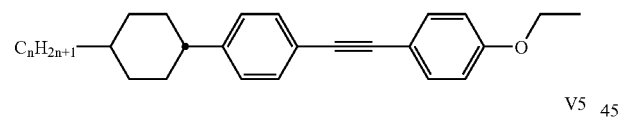

V5
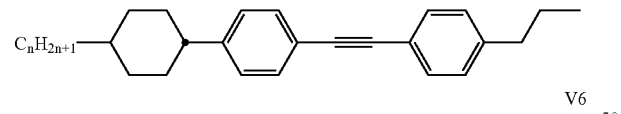

V6
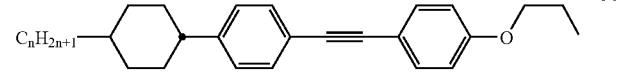

in which n is an integer from 1 to 6, preferably 2, 3 or 4, especially 3. Preferred compounds of formula V are compounds of formula V2, V4 and V6 with n=3 (giving an n-propyl substituent). It is preferred to have a mixture of all three compounds V2, V4 and V6 in the liquid crystal composition.

Preferably, in formula VI above $R^{61}$ is straight-chain alkanyl or alkenyl, especially with 2, 3, 4 or 5 carbon atoms, and $R^{62}$ is straight-chain alkanyl or alkoxy both having 1, 2, 3, 4 or 5 carbon atoms. Especially preferred are compounds of formula VIA or VIB with m=2, 3, 4, 5 and n=1, 2, 3, 4, 5.

IV7
IV8

VIA
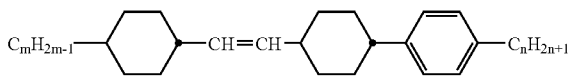

VIB
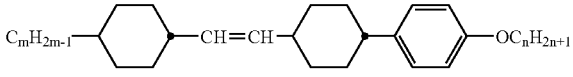

Preferred compounds of formula VI are compounds of formula VII to VI4:

VI1
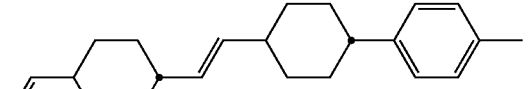

VI2
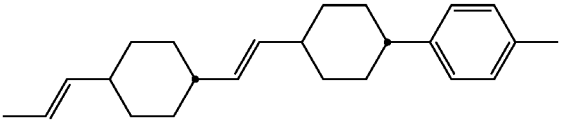

VI3
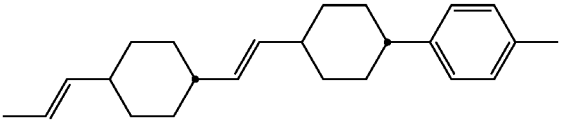

VI4

Especially preferred are compounds of formula VI1, VI3 and VI4. They may be used alone or, more preferred, as a mixture of two or three compounds.

Regarding compounds of formula VII specific compounds are of the following formulas VIIA
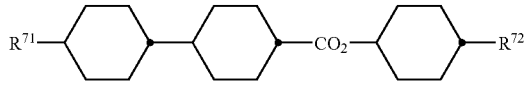

-continued

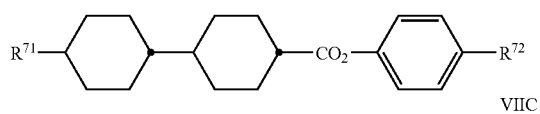

VIIB

VIIC

VIID with $R^{71}$ and $R^{72}$ being as defined above. Preferably, $R^{71}$ and $R^{72}$ are straight-chain alkyl, especially alkanyl, with 1, 2, 3, 4, 5 or 6 carbon atoms. Preferred compounds of formula VII are:

VIIC1

VIID1 with n and m being independently of each other 1, 2, 3, 4, 5 or 6. Especially preferred examples of compounds of formula VII are

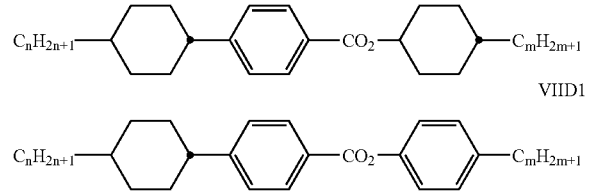

VII-1

VII-2

VII-3

VII-4

Regarding compounds of formula VIII specific compounds are of the following formulas

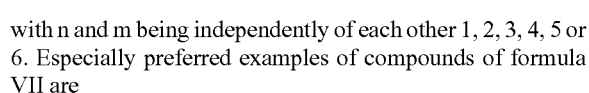

VIIIA

Preferably, in formula VIII $R^{81}$ is straight-chain alkanyl or alkenyl, especially having 2, 3, 4 or 5 carbon atoms, and $R^{82}$ is straight-chain alkanyl having 1, 2, 3, 4 or 5 carbon atoms (formula VIIIA or VIIIB with m=2, 3, 4, 5, n=1, 2, 3, 4, 5, and p=1, 2, 3, 4, 5).

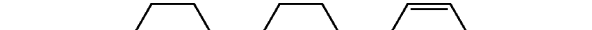

VIIIA

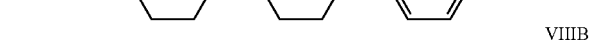

VIIIB

Especially preferred examples of compounds of formula VIII are

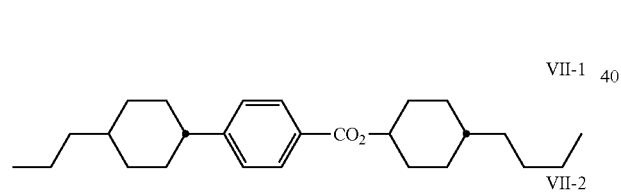

VIII-1

VIII-2

VIII-3

VIII-4

VIII-5

VIII-6

VIII-7

VIII-8

Compounds of formula III to VIII are usually used in the liquid crystal composition according to the invention in a total amount of up to 40 weight %, preferably in a total amount of 0 to about 20 weight %, more preferably in a total amount of about 2 to about 18 weight % and especially in a total amount of about 3 to about 15 weight %. Compounds of each formula III to VIII may be present in a single composition although it is preferred that compounds of only one, two or three different of these formulas are contained in a specific liquid crystal mixture of the present invention. For instance, in a specific composition there might be only compounds of formulas III and IV or of formulas V and VI and so on. It is, however, especially preferred that compounds of only one of these formulas III to VIII are present in a single specific composition according to the invention.

The liquid crystal composition according to the invention may also comprise compounds of the following formulas:

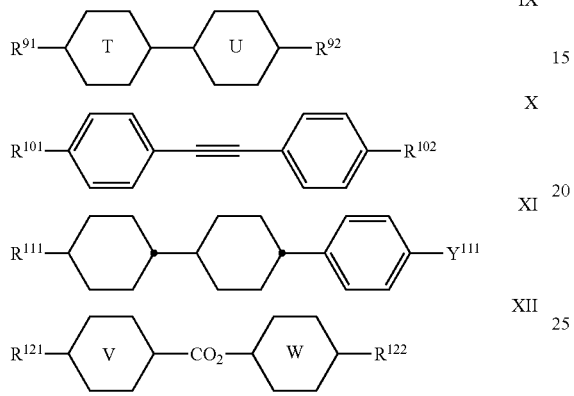

in which

R$^{91}$, R$^{92}$, R$^{101}$, R$^{102}$, R$^{111}$, R$^{121}$ and R$^{122}$ are independently of each other C$_1$-C$_{15}$ alkyl which is unsubstituted or mono- or poly-substituted with halogen and in which one or more of the CH$_2$ groups may be replaced independently of each other by —O—, —S—, —CH=CH—, —C≡C—, —CO—O—, —OC—O— such that there are no hetero atoms directly linked to each other; preferably these radicals are independently of each other straight-chain alkanyl, alkenyl or alkoxy radicals with up to 8 carbon atoms;

Y$^{111}$ is C$_1$-C$_{15}$ alkanyl or C$_2$-C$_{15}$ alkenyl that are independently of each other mono- or poly-substituted with halogen, or C$_1$-C$_{15}$ alkoxy which is mono- or poly-substituted with halogen; preferably it is an alkanyl or an alkoxy radical with up to 8 carbon atoms in which each of the hydrogen atoms are

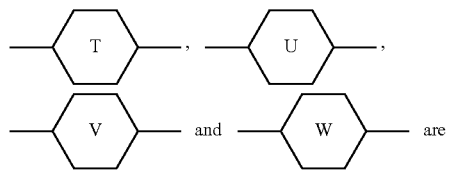

independently of each other

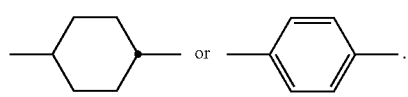

Preferred compounds of formula IX are compounds of the following formulas:

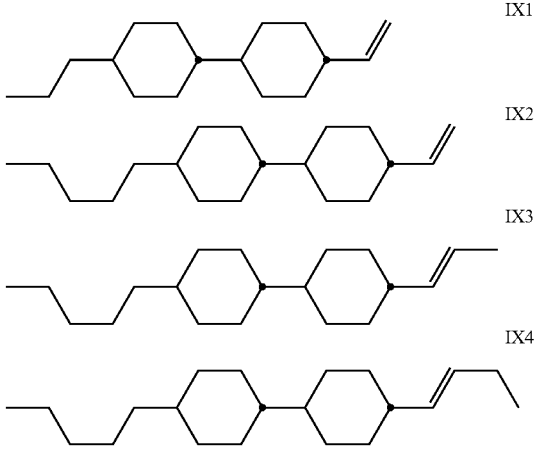

in which n and p are independently of each other an integer from 1 to 8, preferably 2, 3, 4, 5 or 6, and m and q are independently of each other an integer from 2 to 8, preferably 2, 3, 4, 5 or 6.

Preferred examples of compounds of formula IX are:

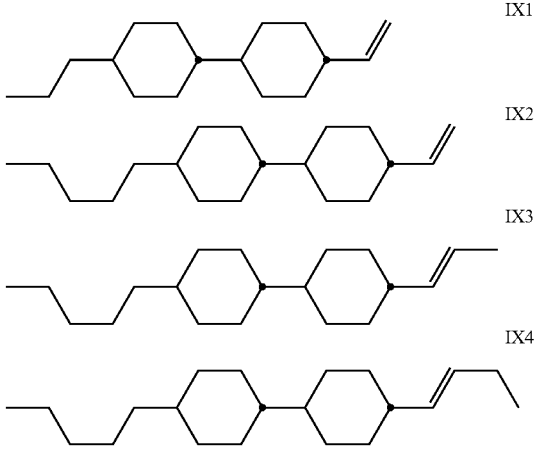

-continued

IX5

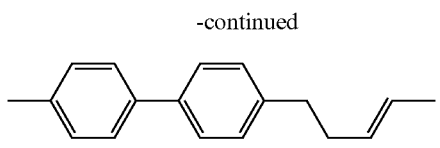

Preferred compounds of formula X are compounds of the following formulas:

XA

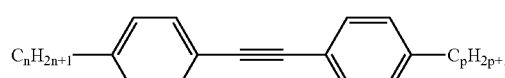

XB

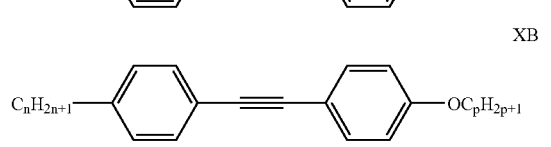

with n being 1, 2, 3, 4, 5, 6, 7 or 8 and p being 1, 2, 3, 4, 5 or 6. Preferred examples of compounds of formula X are the following compounds:

X1

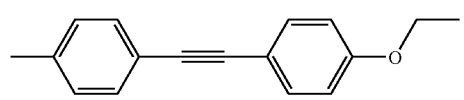

X2

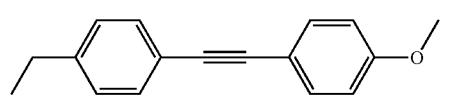

X3

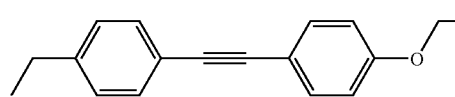

X4

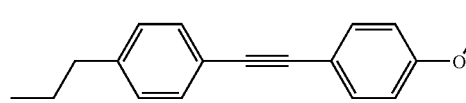

X5

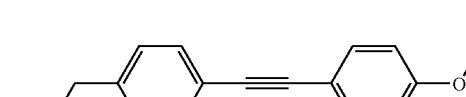

X6

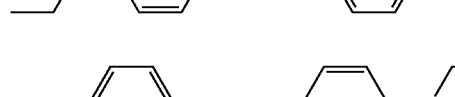

Preferred compounds of formula XI are compounds of the following formulas:

XIA

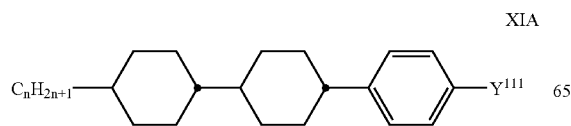

XIB

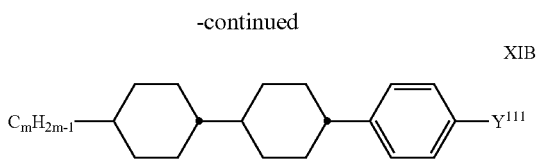

with n being 1, 2, 3, 4, 5 or 6, m being 2, 3, 4, 5 or 6, and $Y^{111}$ being preferably selected from $CF_3$ and $OCF_3$. Preferred compounds of formula XI are the following compounds:

XI1

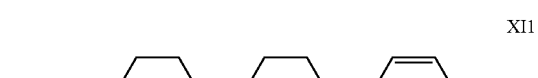

XI2

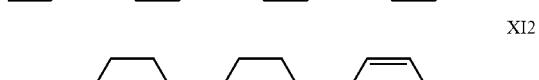

XI3

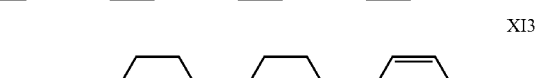

XI4

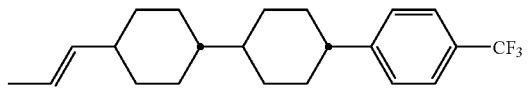

Preferred compounds of formula XII are compounds of the following formulas:

XIIA

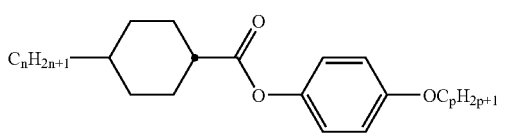

XIIB

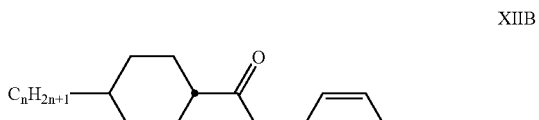

XIIC

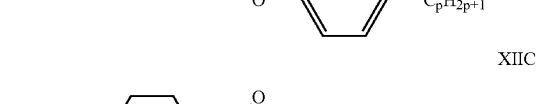

XIID

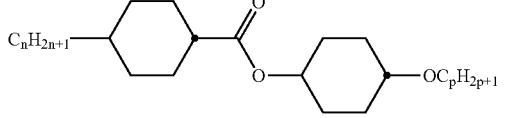

-continued

XIIE $C_nH_{2n+1}$—[benzoate ester]—$OC_pH_{2p+1}$

XIIF $C_nH_{2n+1}$—[benzoate ester]—$C_pH_{2p+1}$ with n being 1, 2, 3, 4, 5 or 6 and p being 1, 2, 3, 4, 5 or 6. Specific examples of compounds of formula XII are the following compounds:

XII1

XII2

XII3

XII4

XII5

XII6

XII7

XII8

XII9

XII10

XII11

Compounds of formula IX to XII are usually used in the liquid crystal composition according to the invention in a total amount of up to 40 weight %, preferably in a total amount of 0 to about 20 weight %, more preferably in a total amount of about 2 to about 18 weight % and especially in a total amount of about 3 to about 15 weight %. Compounds of each formula IX to XII may be present in a single composition although it is preferred that compounds of only one, two or three different of these formulas are contained in a specific liquid crystal mixture of the present invention. For instance, in a specific composition there might be only compounds of formulas IX and X or of formulas XI and XII and so on. It is, however, especially preferred that compounds of only one of these formulas IX to XII are present in a single specific composition according to the invention.

The liquid crystal composition according to the invention may also comprise compounds of the following formulas:

XIII $R^{131}$—[cyclohexyl-cyclohexyl]—$Z^{131}$—[phenyl]—$X^{131}$

XIV $R^{141}$—[cyclohexyl-phenyl]—$Z^{141}$—[phenyl]—$X^{141}$ in which
$R^{131}$ and $R^{141}$ are independently of each other $C_1$-$C_{15}$ alkyl which is unsubstituted or mono- or poly-substituted with halogen and in which one or more of the $CH_2$ groups may be replaced independently of each other by —O—, —S—, —CH=CH—, —C≡C—, —CO—O—, —OC—O— such that there are no hetero atoms directly linked to each other; preferably these radicals are independently of each other straight-chain alkanyl, alkenyl or alkoxy radicals with up to 8 carbon atoms;

$X^{131}$ and $X^{141}$ are independently of each other F or Cl, preferably F; and $Z^{131}$ and $Z^{141}$ are independently of each other a single bond, —CF$_2$O— or —CO—O—, preferably a single bond.

Preferred compounds of formula XIII are compounds of the following formulas:

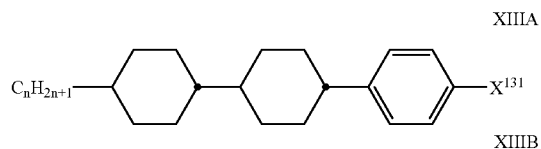
XIIIA

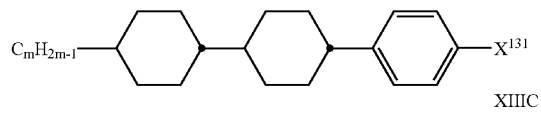
XIIIB

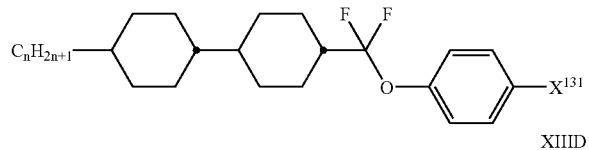
XIIIC

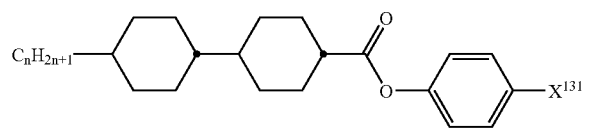
XIIID with n being 1, 2, 3, 4, 5, 6, 7 or 8, preferably 2, 3, 4, 5, m being 2, 3, 4, 5, 6, 7, 8, preferably 2, 3, 4, 5, and $X^{131}$ being F or Cl, preferably F. Preferred examples of formula XIII are the following compounds:

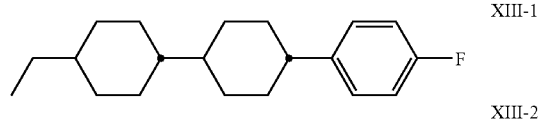
XIII-1

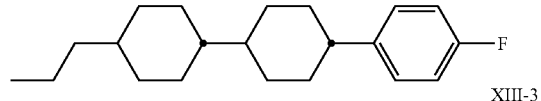
XIII-2

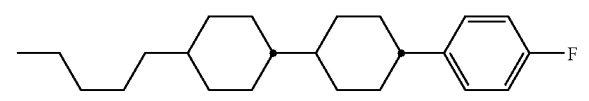
XIII-3

Preferred compounds of formula XIV are compounds of the following formulas:

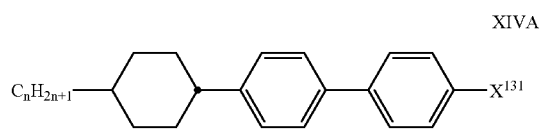
XIVA

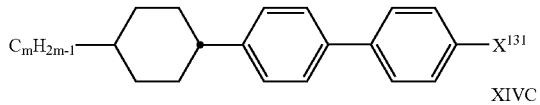
XIVB

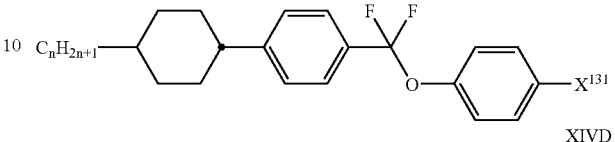
XIVC

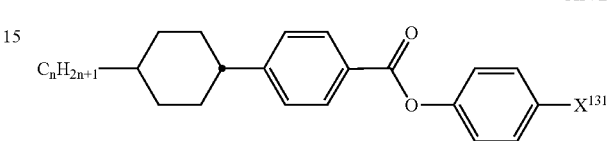
XIVD

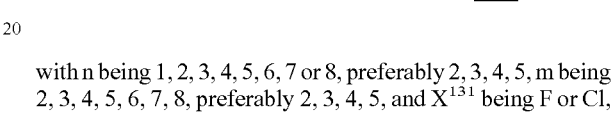

with n being 1, 2, 3, 4, 5, 6, 7 or 8, preferably 2, 3, 4, 5, m being 2, 3, 4, 5, 6, 7, 8, preferably 2, 3, 4, 5, and $X^{131}$ being F or Cl, preferably F. Preferred examples of formula XIII are the following compounds:

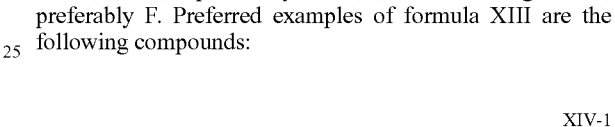
XIV-1

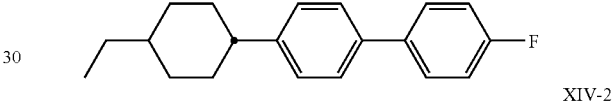
XIV-2

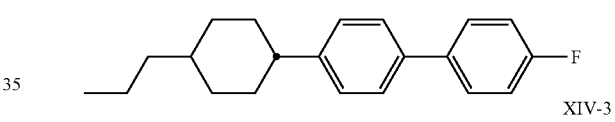
XIV-3

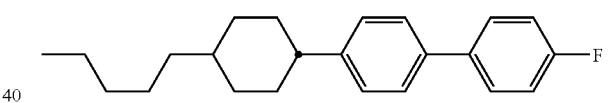

Compounds of formulas XIII and XIV are usually used in the liquid crystal composition according to the invention in a total amount of 0 to about 40 weight %, preferably in a total amount of up to 20 weight % and more preferably in a total amount of up to 10 weight %. Compounds of each formula XIII and XIV may be present in a single composition although it is preferred that compounds of only one of these formulas are contained in a specific liquid crystal mixture of the present invention.

A specific liquid crystal composition for use in a bistable liquid crystal device may comprise compounds selected from formulas III to VIII (which are, for the sake of simplicity, denoted hereinafter as "Group A") and compounds selected from formulas IX to XII (which are, for the sake of simplicity, denoted hereinafter as "Group B") and compounds selected from formulas XIII and XIV (which are, for the sake of simplicity, denoted hereinafter as "Group C") at the same time. However, this is not specifically required and in some cases it is even preferred that a specific mixture according to the present invention may comprise only compounds of one or two of the Groups A, B and C. It is more preferred that the liquid crystal composition of the invention comprises compounds of Group A and/or Group B.

The liquid crystal composition for use in a bistable liquid crystal device according to the invention may optionally contain one or more further additives known to the skilled person and described in literature. Examples of those further additives are stabilizers, chiral dopants and pleochromatic dyes. If used, they are contained in usual concentrations. The total concentration of said further additives is in the range from 0 to 15 weight %, preferably in the range from 0.1 to 10 weight %, especially preferred not more than 6 weight %, based on the total weight of the composition. The concentration of each single additive is usually in the range from 0.1 to 3 weight %, if present. The concentration of said further additives and likewise constituents of the liquid crystal composition are not taken into account for the specification of the concentration of the other compounds comprised in the liquid crystal composition. As chiral dopants for example cholesterylnonanoate (CN), R/S-811, R/S-1011 and R/S-2011 or CB15 (Merck KGaA, Darmstadt, Germany) may be used.

It will be acknowledged by those skilled in the art that the liquid crystal composition for the use according to the invention may also comprise further (mesogenic) compounds besides those disclosed in more detail in this specification. A wide variety of mesogenic compounds may be used as long as they are not detrimental to the set of parameters important for the use of the bistable liquid crystal composition according to the invention.

All the compounds used in the liquid crystal composition of the bistable liquid crystal devices are either commercially available or can be readily prepared by methods known to those skilled in the art and as described in the standard text books of organic synthesis, for instance, in Houben-Weyl, *Methoden der Organischen Chemie*, Georg-Thieme-Verlag, Stuttgart. The liquid crystal composition will be prepared by applying standard protocols and techniques. In general, the desired amount of the minor component(s) will be dissolved in the major component, usually under elevated temperature. Alternatively, solutions of components in organic solvents like acetone, chloroform or methanol, can be mixed and afterwards the solvent(s) can be removed, e.g., by distillation. Likewise, manufacturing of the bistable devices according to the invention will follow standard techniques known to the artisan.

In the context of the present invention and with respect to the compounds contained in the liquid crystal composition for use in bistable liquid crystal devices and especially in zenithal bistable nematic devices of the invention the term "alkyl" means—as long as it is not defined in a different manner elsewhere in this description or the claims—straight-chain and branched hydrocarbon (aliphatic) radicals with 1 to 15 carbon atoms; the hydrocarbon radicals may be unsubstituted or substituted with one or more substituents being independently selected from the group consisting of F, Cl, Br, or I. This subclass of "alkyl" containing aliphatic saturated radicals may also be designated as "alkanyl". Furthermore, "alkyl" is also meant to comprise unsubstituted or likewise substituted hydrocarbon radicals in which one or more of the $CH_2$ groups are such replaced by —O— ("alkoxy", "oxaalkyl"), —S— ("thioalkyl"), —CH=CH— ("alkenyl"), —C≡C— ("alkynyl"), —CO—O— or —O—CO— that there are no hetero atoms (O, S) linked directly to each other. Preferably, alkyl is a straight-chain or branched saturated hydrocarbon having 1, 2, 3, 4, 5, 6, 7 or 8 carbon atoms and being unsubstituted or mono- or poly-substituted with F. More preferably, alkyl is meant to be methyl, ethyl, n-propyl, i-propyl, n-butyl, i-butyl, t-butyl, n-pentyl, neopentyl, n-hexyl, n-heptyl, n-octyl; $CF_3$, $CHF_2$, $CH_2F$; $CF_2CF_3$. Most preferably, alkyl is a straight-chain hydrocarbon of up to 8 carbon atoms.

Since one or more $CH_2$ groups of an alkyl radical may be replaced by —O— as described above, the term "alkyl" also comprises "alkoxy" and "oxaalkyl" moieties. "Alkoxy" means "O-alkyl" in which the oxygen atom is directly linked to the group or ring being substituted with alkoxy and alkyl is defined as above. In particular, "alkyl" in "O-alkyl" means methyl, ethyl, n-propyl, i-propyl, n-butyl, i-butyl, t-butyl, n-pentyl, neopentyl, n-hexyl, n-heptyl or n-octyl, whereby alkyl is optionally substituted with F. Most preferably, alkoxy is —$OCH_3$, —$OC_2H_5$, —O-n-$C_3H_7$, —O-n-$C_4H_9$, —O-t-$C_4H_9$, —$OCF_3$, —$OCHF_2$, —OCHF or —$OCHFCHF_2$. In the context of the present invention the term "oxaalkyl" comprises alkyl moieties in which at least one non-terminal $CH_2$ group is replaced by O in such a way that there are no adjacent oxygen atoms. Preferably, oxaalkyl comprises straight-chain radicals of the formula $C_tH_{2t+1}$—O—$(CH_2)_u$— in which t and u are independently of each other 1, 2, 3, 4, 5 or 6; especially t is 1 or 2 and u is an integer from 1 to 6.

If one or more of the $CH_2$ groups of alkyl are replaced by sulphur a "thioalkyl" radical is obtained. Thioalkyl comprises alkyl moieties in which at least one terminal or non-terminal $CH_2$ group is replaced by S (sulphur) in such a way that there are no adjacent sulphur atoms. Preferably, thioalkyl comprises straight-chain radicals of the formula $C_tH_{2t+1}$—S—$(CH_2)_u$— in which t is 1, 2, 3, 4, 5 or 6 and u is 0, 1, 2, 3, 4, 5 or 6; especially t is 1 or 2 and u is zero or an integer from 1 to 6.

In the context of the present invention the term "alkenyl" means an alkyl radical in which one or more —CH=CH— moieties are present. When two —CH=CH— moieties are present the radical may also be designated as "alkadienyl". An alkenyl radical may comprise 2 to 15 carbon atoms and may be straight-chain or branched. It can be unsubstituted or mono- or polysubstituted with F, Cl, Br, or I; one or more of its $CH_2$ groups may be replaced independently of each other by —O—, —S—, —C≡C—, —CO—O—, —OC—O— such that there are no hetero atoms linked directly to each other. If the alkenyl CH=CH moiety is not a terminal $CH_2$=CH— group it may exist in two configurations, namely the E-isomer and the Z-isomer. In general, the E-isomer (trans) is preferred. Preferably, alkenyl contains 2, 3, 4, 5, 6 or 7 carbon atoms and means vinyl, 1E-propenyl, 1E-butenyl, 1E-pentenyl, 1E-hexenyl, 1E-heptenyl, 2-propenyl, 2E-butenyl, 2E-pentenyl, 2E-hexenyl, 2E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl and 6-heptenyl. More preferred alkenyl is vinyl, 1E-propenyl, 3E-butenyl.

In the case one or more $CH_2$ alkyl groups are replaced by —C≡C— an alkynyl radical is obtained. Also the replacement of one or more $CH_2$ alkyl groups by —CO—O— or —O—CO— is possible. The following of these radicals are preferred: acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 2-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonyl methyl, ethoxycarbonyl methyl, propoxycarbonylmethyl, butoxycarbonylmethyl, 2-(methoxycarbonyl)ethyl, 2-(ethoxycarbonyl)ethyl, 2-(propoxycarbonyl)-ethyl, 3-(methoxycarbonyl)-propyl, 3-(ethoxy-carbonyl)-propyl or 4-(methoxycarbonyl)-butyl.

For the purpose of this invention the term "halogen" comprises fluorine (F), chlorine (Cl), bromine (Br) and/or iodine (I).

In the context of the present invention halogen substituted radicals like, for instance, halogen substituted alkyl, alkanyl, alkoxy and alkenyl radicals may also be designated as "halogenalkyl", "halogenalkanyl", "halogenalkoxy" and "halogenalkenyl", respectively. For instance, if halogen is F, a fluoro-substituted alkyl may be designated as "fluoroalkyl". The term "perhalogen", e.g. "perfluoro" designates a radical in which all of the hydrogen substituents of the radical are replaced by halogen, e.g. fluor. If only some of the hydrogens atoms are replaced by halogen, it is preferred that they are replaced at the o-position of that radical like, for example, in —$CH_2CF_3$.

In the present description and the following examples the structures of the mesogenic compounds disclosed are described by using acronyms. Said acronyms can be transformed into chemical formulas according to Tables A and B. In these tables, radicals $C_nH_{2n+1}$ and $C_mH_{2m+1}$ are straight-chain alkyl radicals having n and m carbon atoms, respectively. Alkenyl radicals have the trans configuration. The codes according to Table B are self-evident. In Table A, only the acronym for the parent structure is given. In individual cases, the acronym for the parent structure is followed, usually separated by a hyphen, by a code for the substituents $R^1$, $R^2$, $L^1$ and $L^2$ as given below:

| Code of $R^1$, $R^2$, $L^1$, $L^2$ | $R^1$ | $R^2$ | $L^1$ | $L^2$ |
|---|---|---|---|---|
| n | $C_nH_{2n+1}$ | CN | H | H |
| nm | $C_nH_{2n+1}$ | $C_mH_{2m+1}$ | H | H |
| nOm | $C_nH_{2n+1}$ | $OC_mH_{2m+1}$ | H | H |
| nF | $C_nH_{2n+1}$ | F | H | H |
| nN.F | $C_nH_{2n+1}$ | CN | F | H |
| nN.F.F | $C_nH_{2n+1}$ | CN | F | F |

TABLE A

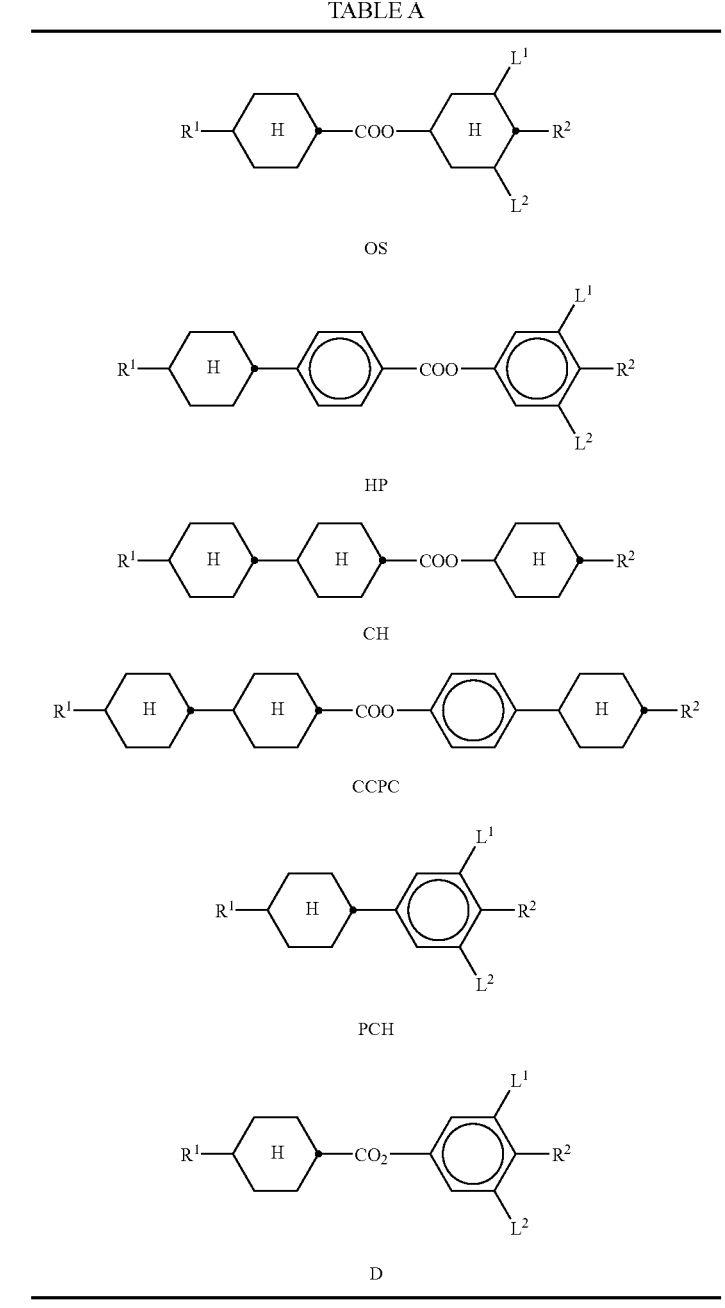

TABLE B
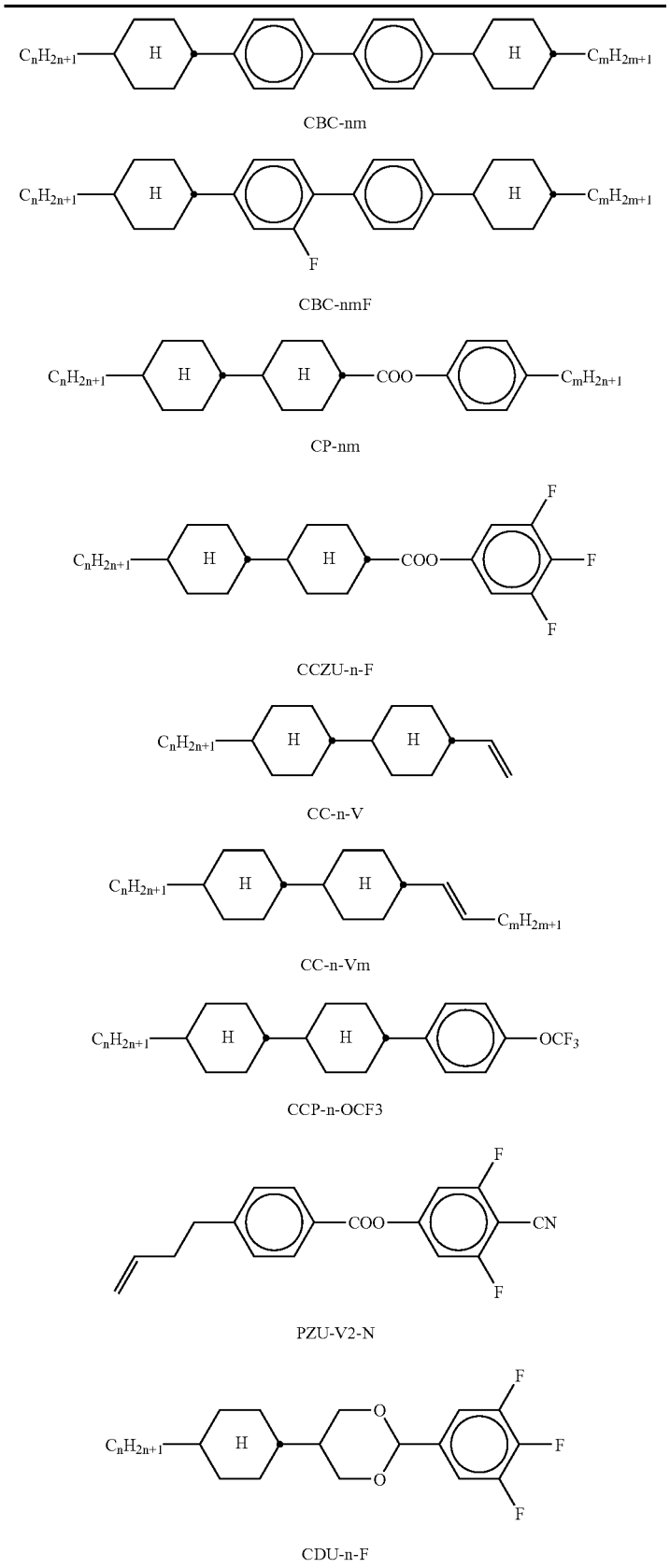

TABLE B-continued
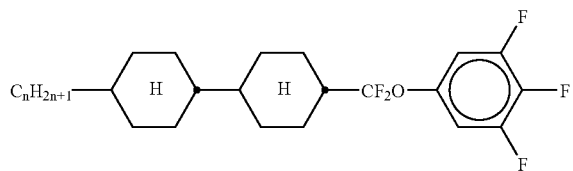
CCQU-n-F
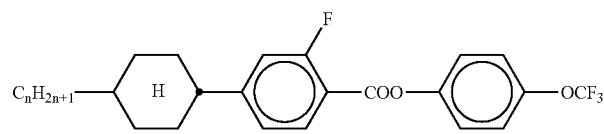
CGZP-n-OT
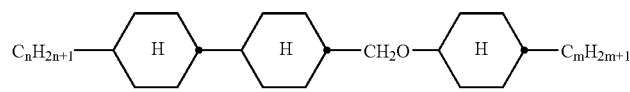
CCOC-n-m
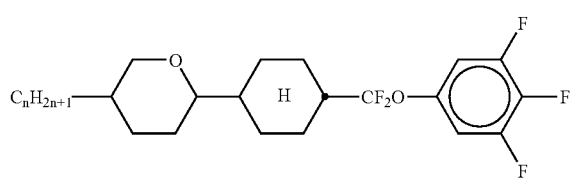
ACQU-n-F
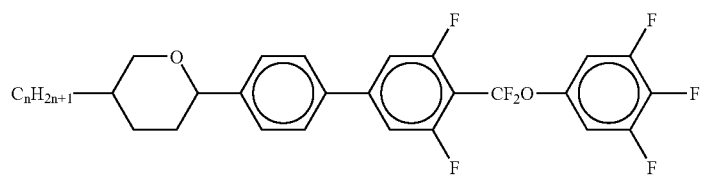
APUQU-n-F
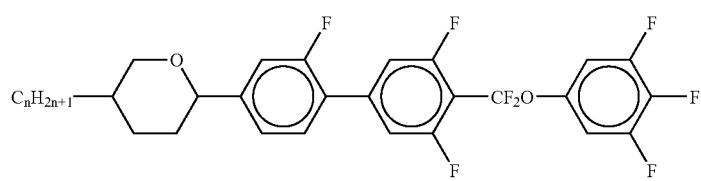
AGUQU-n-F
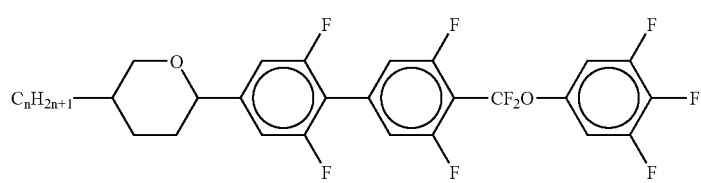
AUUQU-n-F TABLE B-continued
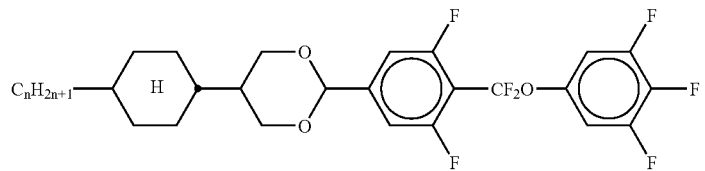
CDUQU-n-F
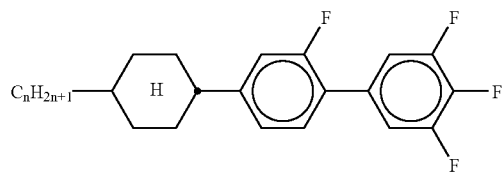
CGU-n-F
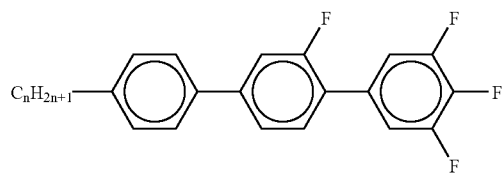
PGU-n-F
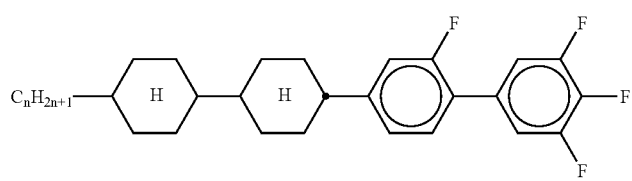
CCGU-n-F
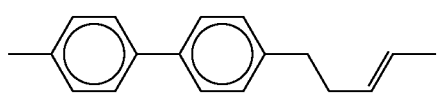
PP-1-2V1
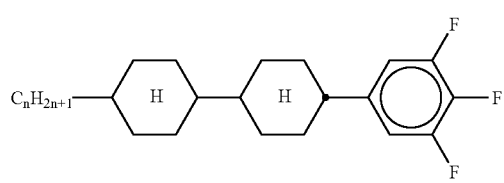
CCP-nF.F.F
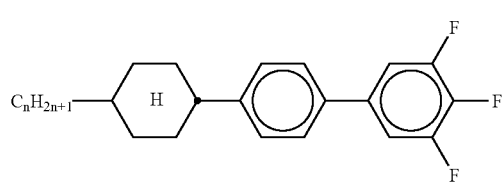
BCH-nF.F.F TABLE B-continued
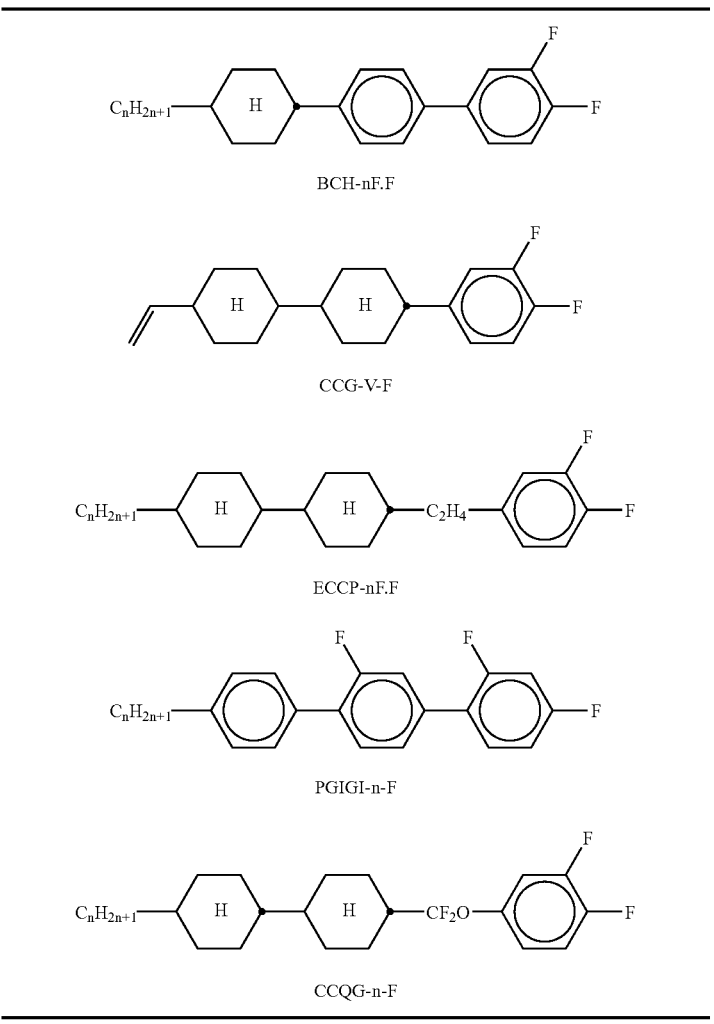
BCH-nF.F
CCG-V-F
ECCP-nF.F
PGIGI-n-F
CCQG-n-F
TABLE C
Table C shows dopants optionally present in the liquid crystal compositions for use in the zenithal bistable nematic devices of the invention.
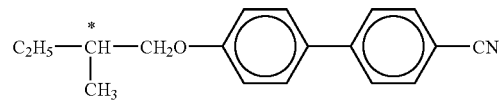
C15
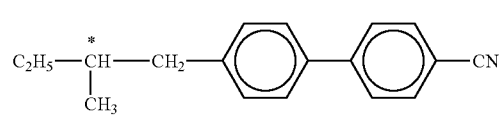
CB 15
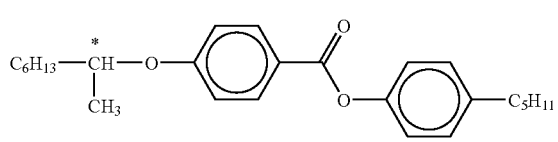
CM21

TABLE C-continued
Table C shows dopants optionally present in the liquid crystal compositions for use in the zenithal bistable nematic devices of the invention.
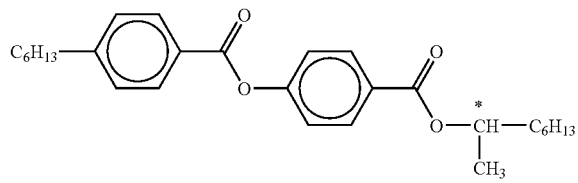
R/S-811
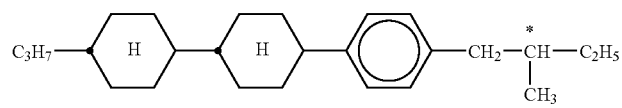
CM 44
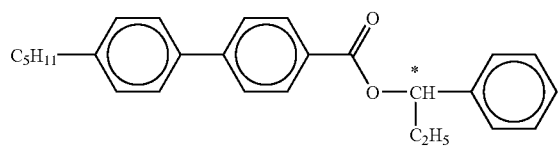
CM 45
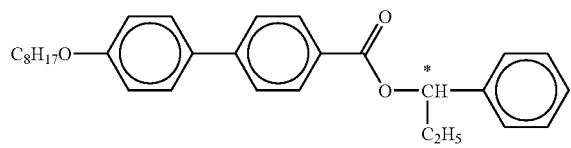
CM 47
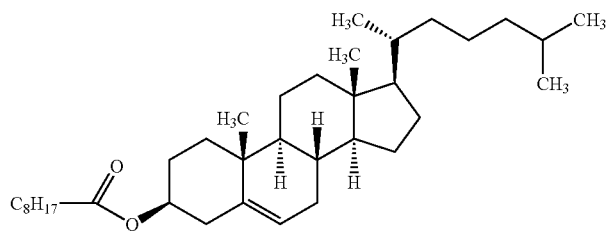
CN
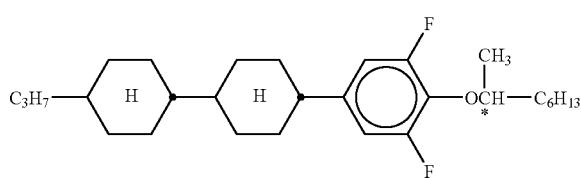
R/S-2011
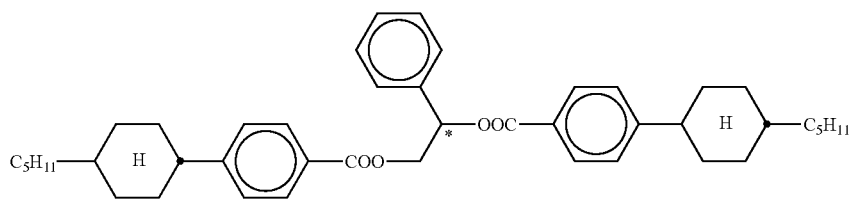
R/S-1011

TABLE C-continued
Table C shows dopants optionally present in the liquid crystal compositions for use in the zenithal bistable nematic devices of the invention.
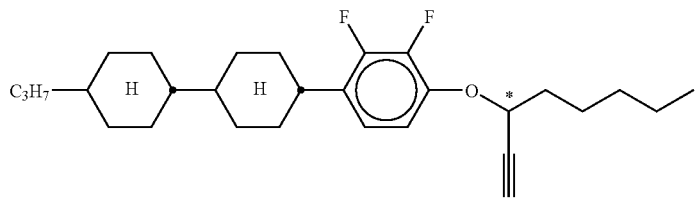
R/S-3011
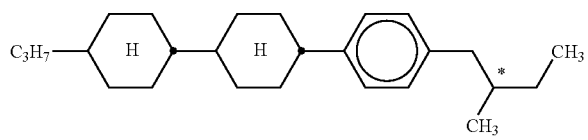
TABLE D
Table D shows stabilizers optionally present in the liquid crystal compositions for use in the zenithal bistable nematic devices of the invention.
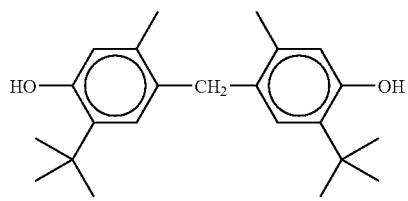
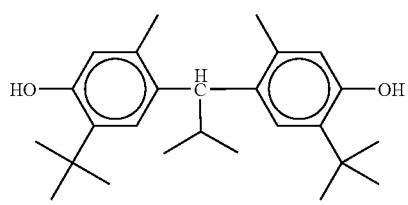
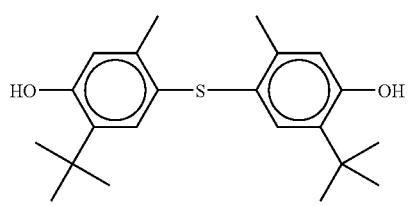
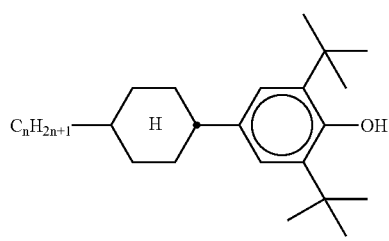

TABLE D-continued
Table D shows stabilizers optionally present in the liquid crystal compositions for use in the zenithal bistable nematic devices of the invention.
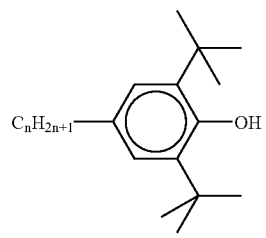
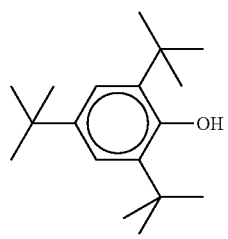
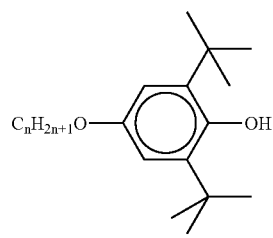
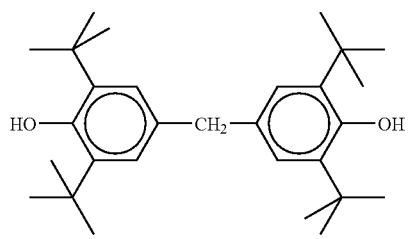
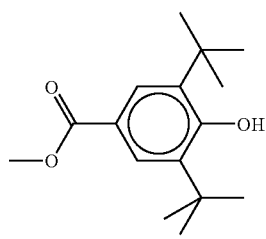
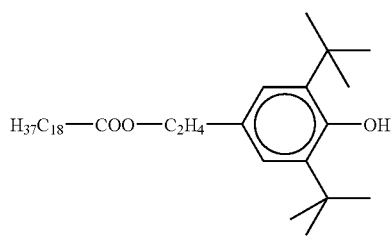

TABLE D-continued
Table D shows stabilizers optionally present in the liquid crystal compositions for use in the zenithal bistable nematic devices of the invention.
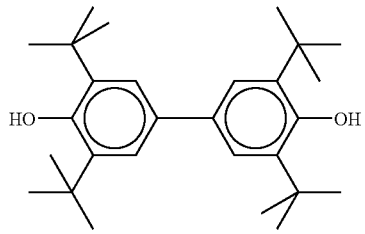
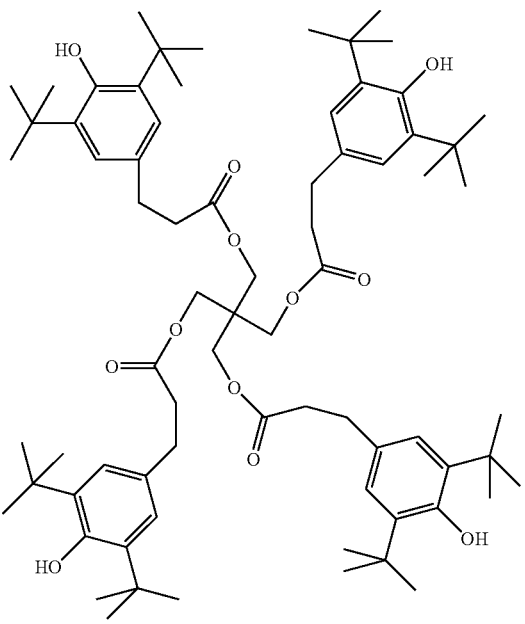
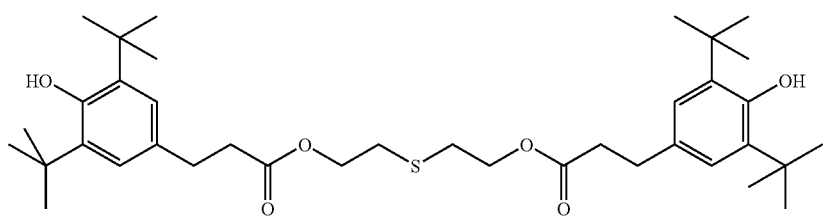
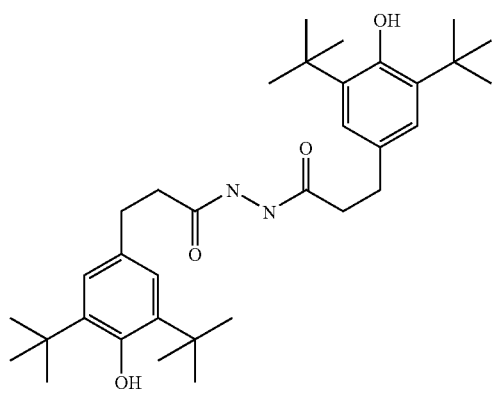

TABLE D-continued
Table D shows stabilizers optionally present in the liquid crystal compositions for use in the zenithal bistable nematic devices of the invention.
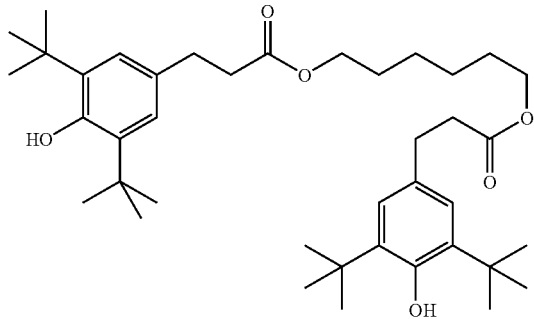
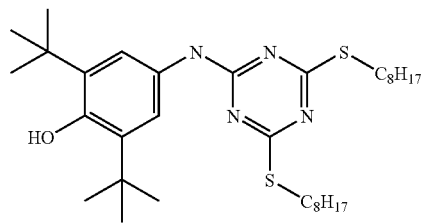
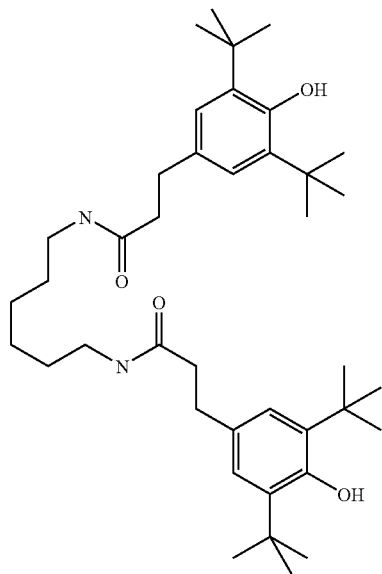

TABLE D-continued
Table D shows stabilizers optionally present in the liquid crystal compositions for use in the zenithal bistable nematic devices of the invention.
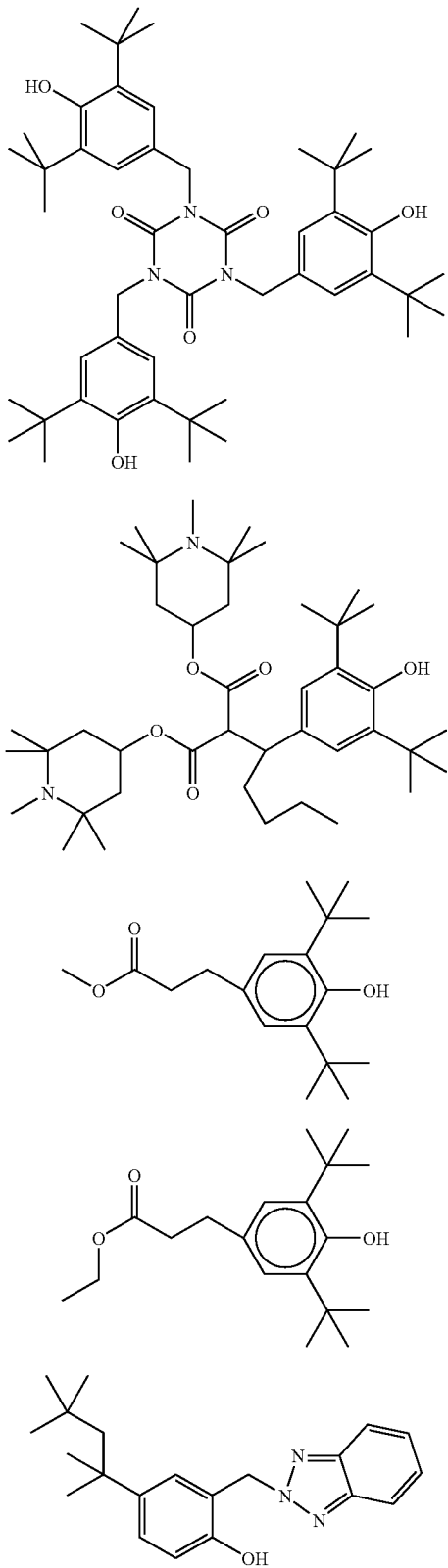

TABLE D-continued
Table D shows stabilizers optionally present in the liquid crystal compositions for use in the zenithal bistable nematic devices of the invention.
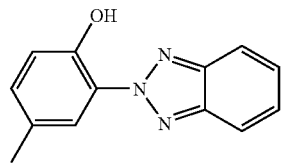
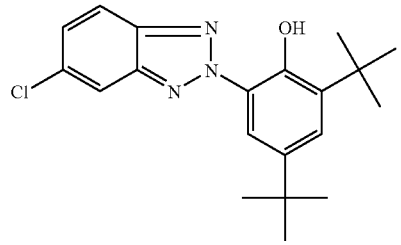
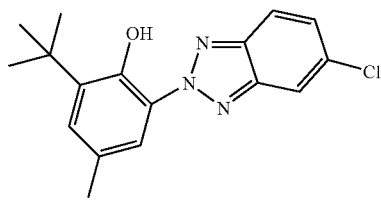
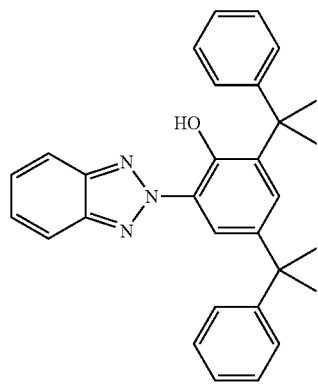
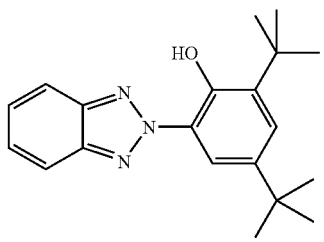
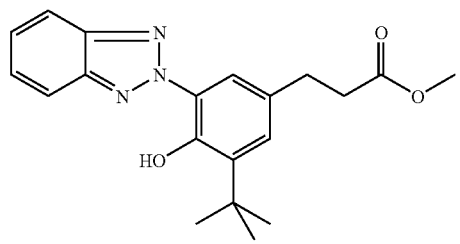

TABLE D-continued
Table D shows stabilizers optionally present in the liquid crystal compositions for use in the zenithal bistable nematic devices of the invention.
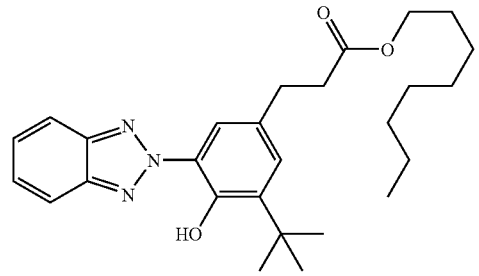
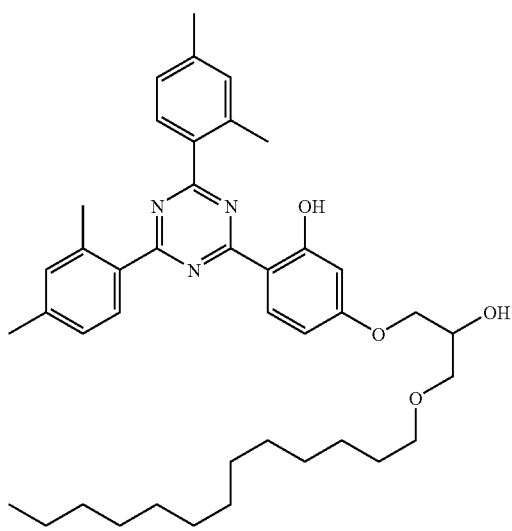
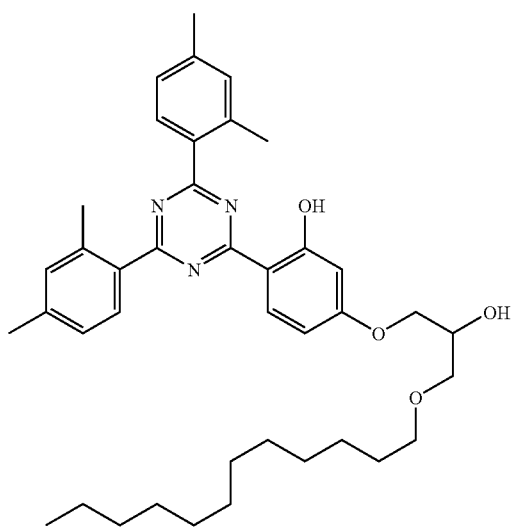

TABLE D-continued

Table D shows stabilizers optionally present in the liquid crystal compositions for use in the zenithal bistable nematic devices of the invention.

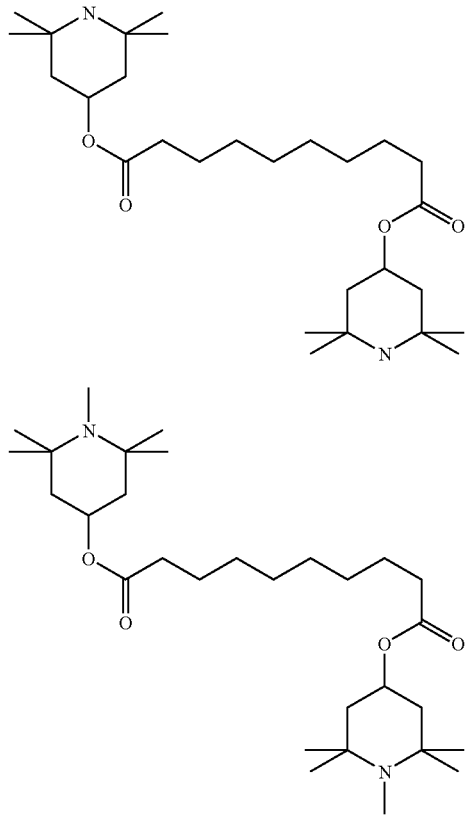

Percentages given herein are weight % and generally related to the total amount of a composition or mixture except stated otherwise. Temperatures are given in degree Celsius (° C.) unless stated otherwise. $T_{N1}$ means the clearing point at which a nematic medium becomes isotropic. Δn is the optical anisotropy (birefringence) (at 589 nm, 20° C.). Δ∈ means the dielectric anisotropy (at 1 kHz, 20° C.). $K_1$ is the splay elastic constant, and $K_3$ is the bend elastic constant both given in pN. Electrooptical data has been determined in a vertically aligned zenithal bistable nematic cell. Except stated otherwise the measurements have been performed at 20° C. $V_{opt}$ is the optimum operating voltage (in V) derived from the corrected switching field $E_{LC@100\ \mu s}$ (at 25° C.; in zenithal bistable test cells with the actual cell gap d of about 4 to about 5 μm; 100 μs pulse) by $V_{opt} = E_{LC@100\ \mu s} \cdot d_{opt}$ (with $d_{opt}$ (in μm) being $\lambda/(2\Delta n)+0.4$ for Δn<0.11 and $\lambda\sqrt{3}/(2\Delta n)+0.4$ for Δn>0.11; λ=0.555 μm, and the 0.4 factor is an empirical correction factor), if not stated otherwise. Optical response time $\tau_{opt}$ (in ms) is calculated from $\tau_{opt} = \tau \cdot d^2_{opt}/d^2$ with τ being the experimental response time, $d_{opt}$ being as defined above and d being the experimental cell gap.

The following Examples should further illustrate the present invention as described above and in the claims but not meant to restrict its scope.

EXAMPLES

Test samples were prepared by weighing out the appropriate weight amounts (percentage weight/weight) of the individual components. The sample was then homogenised by heating into the isotropic phase and thoroughly mixing. The mixture was then stirred with a given concentration of alumina and then filtered (0.2 μm) to just leave the liquid crystal mixture. The nematic to isotropic transition temperature (or clearing point, $T_{N1}$), dielectric anisotropy (Δδ), birefringence (Δn), splay and bend elastic constants ($K_1$ and $K_3$), and rotational viscosities ($\gamma_1$) were determined as described in the Merck brochure "Physical Properties of Liquid Crystals—Description of the measurement methods", ed. W. Becker (1998). Values for single compounds are extrapolated from those determined using a known concentration (usually 10 weight % of the single compound) in a standard host mixture ZLI-4792 (Merck KGaA, Darmstadt, Germany) for which the initial mixture values are also known. The electrooptical performance of each mixture in a zenithal bistable nematic device was measured using a simple experimental set-up and the vertically aligned type test cells. This required a transmissive mode microscope with a mounted photo-detector connected to an oscilloscope. This allowed the transmission through crossed polarisers to be monitored. The test cell was mounted on a heating stage under the microscope to permit measurements at 25° C. Bipolar electrical pulses (of varying duration and voltage) were used to ensure that there was no net d.c. voltage applied to the cell. The trailing edge (and so polarity) of each pulse therefore determined the final switched state (depending on the duration and voltage). Two signal generators were necessary to ensure that the correct initial state is first selected, with the first signal triggering the second (with an appropriate phase difference). Both signals were amplified by passing the output of the signal generators through an amplifier before being connected to the test cell. For the B-W transition, the voltages required for 10 and 90% transmission changes and reverse 90 and 10% transmission changes were measured for various pulse durations. For the W-B transition, the voltages required for 90 and 10% transmission changes only were measured for various pulse durations. These levels were set on the oscilloscope once the 0 and 100% transmission levels were known (i.e. black and white), and they could also be used to determine the optical response time of the transition (for 10 to 90% transmission changes). $E_{LC@100\,\mu s}$ was determined from the average switching field of both the W-B and B-W transitions in these examples.

Vertically aligned type test cells having a standard homeotropic alignment layer on one substrate and a grating plus homeotropic alignment layer on the other substrate (available from ZBD Displays Ltd., Malvern, UK) were used with cell gaps typically 4-5 µm, in transmissive mode and with crossed polarisers. Due to the varying cell gaps and different mixture $\Delta n$ values, the retardation was not optimised but this is not crucial as it only decreases the contrast.

Example 1

| Compound | Amount (wt %) | $T_{NI}$ (° C.) | 98.0 |
|---|---|---|---|
| CDU-2-F | 10 | $\Delta\epsilon$ | 13.7 |
| CDU-3-F | 10 | $\Delta n$ | 0.0685 |
| CDU-5-F | 10 | $K_1$ (pN) | 10.6 |
| CCZU-2-F | 6 | $K_3$ (pN) | 17.7 |
| CCZU-3-F | 13 | | |
| CCZU-5-F | 6 | | |
| CCQU-2-F | 10 | $\tau_{opt}$ (ms) | 36 |
| CCQU-3-F | 10 | $d$ (µm) | 4.7 |
| CCQU-5-F | 10 | $d_{opt}$ (µm) | 4.5 |
| CCOC-3-3 | 5 | $V_{opt}^{100\,\mu s}$ (V) | 12.8 |
| CCOC-3-5 | 5 | $V_{opt}^{1000\,\mu s}$ (V) | 9.4 |
| CCOC-4-3 | 5 | $V_{opt}^{10000\,\mu s}$ (V) | 5.7 |
| Total | 100 | | |

Example 2

| Compound | Amount (wt %) | $T_{NI}$ (° C.) | 100.5 |
|---|---|---|---|
| CDU-2-F | 10 | $\Delta\epsilon$ | 12.4 |
| CDU-3-F | 10 | $\Delta n$ | 0.0716 |
| CDU-5-F | 10 | $K_1$ (pN) | 11.4 |
| CCZU-2-F | 5 | $K_3$ (pN) | 17.1 |
| CCZU-3-F | 10 | | |
| CCZU-5-F | 5 | | |
| CCQU-2-F | 10 | $\tau_{opt}$ (ms) | 33 |
| CCQU-3-F | 10 | $d$ (µm) | 4.5 |
| CCQU-5-F | 10 | $d_{opt}$ (µm) | 4.3 |
| CC-5-V | 12 | $V_{opt}^{100\,\mu s}$ (V) | 14.4 |
| CCPC-33 | 3 | $V_{opt}^{1000\,\mu s}$ (V) | 10.3 |
| CCPC-34 | 3 | $V_{opt}^{10000\,\mu s}$ (V) | 8.0 |
| CCPC-35 | 2 | | |
| Total | 100 | | |

Example 3

| Compound | Amount (wt %) | $T_{NI}$ (° C.) | 93.8 |
|---|---|---|---|
| PGU-2-F | 10 | $\Delta\epsilon$ | 17.3 |
| PGU-3-F | 10 | $\Delta n$ | 0.1350 |
| PGU-5-F | 10 | $K_1$ (pN) | 12.0 |
| CCGU-3-F | 5 | $K_3$ (pN) | 16.0 |
| CCZU-2-F | 5 | | |
| CCZU-3-F | 10 | | |
| CCZU-5-F | 5 | $\tau_{opt}$ (ms) | 22 |
| CCQU-2-F | 10 | $d$ (µm) | 4.7 |
| CCQU-3-F | 10 | $d_{opt}$ (µm) | 4.0 |
| CCQU-5-F | 10 | $V_{opt}^{100\,\mu s}$ (V) | 18.6 |
| PP-1-2V1 | 9 | $V_{opt}^{1000\,\mu s}$ (V) | 15.9 |
| CCPC-33 | 4 | $V_{opt}^{10000\,\mu s}$ (V) | 15.0 |
| CCPC-34 | 1 | | |
| CCPC-35 | 1 | | |
| Total | 100 | | |

Example 4

| Compound | Amount (wt %) | $T_{NI}$ (° C.) | 100.0 |
|---|---|---|---|
| CGU-2-F | 10 | $\Delta\epsilon$ | 14.9 |
| CGU-3-F | 10 | $\Delta n$ | 0.0931 |
| CGU-5-F | 10 | $K_1$ (pN) | 8.6 |
| CCGU-3-F | 5 | $K_3$ (pN) | 17.3 |
| CCZU-2-F | 7 | | |
| CCZU-3-F | 15 | | |
| CCZU-5-F | 7 | $\tau_{opt}$ (ms) | 19 |
| CCQU-2-F | 10 | $d$ (µm) | 4.4 |
| CCQU-3-F | 10 | $d_{opt}$ (µm) | 3.4 |
| CCQU-5-F | 10 | $V_{opt}^{100\,\mu s}$ (V) | 8.1 |
| CCPC-33 | 2 | $V_{opt}^{1000\,\mu s}$ (V) | 5.0 |
| CCPC-34 | 2 | $V_{opt}^{10000\,\mu s}$ (V) | 4.0 |
| CCPC-35 | 2 | | |
| Total | 100 | | |

Example 5

| Compound | Amount (wt %) | $T_{NI}$ (° C.) | 90.8 |
|---|---|---|---|
| PGU-2-F | 10 | $\Delta\epsilon$ | 15.9 |
| PGU-3-F | 10 | $\Delta n$ | 0.1465 |
| PGU-5-F | 10 | $K_1$ (pN) | 9.2 |
| CGU-2-F | 10 | $K_3$ (pN) | 12.5 |
| CGU-3-F | 10 | | |
| CGU-5-F | 10 | | |
| CCGU-3-F | 5 | $\tau_{opt}$ (ms) | 29 |

-continued

| Compound | Amount (wt %) | $T_{NI}$ (° C.) | 90.8 |
|---|---|---|---|
| BCH-3F.F.F | 10 | d (μm) | 4.4 |
| BCH-5F.F.F | 10 | $d_{opt}$ (μm) | 3.7 |
| CCPC-33 | 5 | $V_{opt}^{100\,\mu s}$ (V) | 16.2 |
| CCPC-34 | 5 | $V_{opt}^{1000\,\mu s}$ (V) | 14.0 |
| CCPC-35 | 5 | $V_{opt}^{10000\,\mu s}$ (V) | 13.5 |
| Total | 100 | | |

Example 6

| Compound | Amount (wt %) | $T_{NI}$ (° C.) | 91.8 |
|---|---|---|---|
| PGU-2-F | 10 | $\Delta\epsilon$ | 17.4 |
| PGU-3-F | 10 | $\Delta n$ | 0.1338 |
| PGU-5-F | 10 | $K_1$ (pN) | 8.1 |
| CGU-2-F | 10 | $K_3$ (pN) | 13.2 |
| CGU-3-F | 10 | | |
| CGU-5-F | 10 | | |
| CCGU-3-F | 3 | $\tau_{opt}$ (ms) | 30 |
| CCZU-2-F | 6 | d (μm) | 4.4 |
| CCZU-3-F | 13 | $d_{opt}$ (μm) | 4.0 |
| CCZU-5-F | 6 | $V_{opt}^{100\,\mu s}$ (V) | 15.8 |
| CCPC-33 | 4 | $V_{opt}^{1000\,\mu s}$ (V) | 13.4 |
| CCPC-34 | 4 | $V_{opt}^{10000\,\mu s}$ (V) | 12.8 |
| CCPC-35 | 4 | | |
| Total | 100 | | |

Example 7

| Compound | Amount (wt %) | $T_{NI}$ (° C.) | 91.2 |
|---|---|---|---|
| CDU-2-F | 10 | $\Delta\epsilon$ | 15.4 |
| CDU-3-F | 10.5 | $\Delta n$ | 0.0933 |
| CDU-5-F | 9.5 | $K_1$ (pN) | 7.4 |
| CGU-2-F | 10 | $K_3$ (pN) | 14.8 |
| CGU-3-F | 10 | | |
| CGU-5-F | 10 | | |
| CCGU-3-F | 5 | $\tau_{opt}$ (ms) | 22 |
| CCZU-2-F | 6.5 | d (μm) | 4.7 |
| CCZU-3-F | 13 | $d_{opt}$ (μm) | 3.4 |
| CCZU-5-F | 6.5 | $V_{opt}^{100\,\mu s}$ (V) | 9.7 |
| CCPC-33 | 3 | $V_{opt}^{1000\,\mu s}$ (V) | 7.4 |
| CCPC-34 | 4 | $V_{opt}^{10000\,\mu s}$ (V) | 5.9 |
| CCPC-35 | 2 | | |
| Total | 100 | | |

Example 8

| Compound | Amount (wt %) | $T_{NI}$ (° C.) | 92.8 |
|---|---|---|---|
| PGU-2-F | 10 | $\Delta\epsilon$ | 16.2 |
| PGU-3-F | 10 | $\Delta n$ | 0.1134 |
| PGU-5-F | 10 | $K_1$ (pN) | 9.6 |
| CCGU-3-F | 2 | $K_3$ (pN) | 14.1 |
| CCZU-2-F | 6 | | |
| CCZU-3-F | 11 | | |
| CCZU-5-F | 6 | $\tau_{opt}$ (ms) | 35 |

-continued

| Compound | Amount (wt %) | $T_{NI}$ (° C.) | 92.8 |
|---|---|---|---|
| CCQU-2-F | 10 | d (μm) | 4.2 |
| CCQU-3-F | 10 | $d_{opt}$ (μm) | 4.6 |
| CCQU-5-F | 10 | $V_{opt}^{100\,\mu s}$ (V) | 13.7 |
| CCOC-3-3 | 5 | $V_{opt}^{1000\,\mu s}$ (V) | 10.6 |
| CCOC-3-5 | 5 | $V_{opt}^{10000\,\mu s}$ (V) | 8.9 |
| CCOC-4-3 | 5 | | |
| Total | 100 | | |

Example 9

| Compound | Amount (wt %) | $T_{NI}$ (° C.) | 92.6 |
|---|---|---|---|
| CDU-2-F | 10 | $\Delta\epsilon$ | 13.6 |
| CDU-3-F | 10 | $\Delta n$ | 0.0929 |
| CDU-5-F | 10 | $K_1$ (pN) | 9.9 |
| CGU-2-F | 10 | $K_3$ (pN) | 14.0 |
| CGU-3-F | 10 | | |
| CGU-5-F | 10 | | |
| CCGP-3-F | 4 | $\tau_{opt}$ (ms) | 27 |
| CCP-2F.F.F | 8 | d (μm) | 4.2 |
| CCP-3F.F.F | 8 | $d_{opt}$ (μm) | 3.4 |
| CCP-5F.F.F | 4 | $V_{opt}^{100\,\mu s}$ (V) | 13.5 |
| CC-5-V | 2 | $V_{opt}^{1000\,\mu s}$ (V) | 8.7 |
| CCPC-33 | 5 | $V_{opt}^{10000\,\mu s}$ (V) | 7.2 |
| CCPC-34 | 5 | | |
| CCPC-35 | 4 | | |
| Total | 100 | | |

Example 10

| Compound | Amount (wt %) | $T_{NI}$ (° C.) | 98.0 |
|---|---|---|---|
| AUUQU-3-F | 6 | $\Delta\epsilon$ | 18.9 |
| AGUQU-3-F | 6 | $\Delta n$ | 0.0928 |
| APUQU-2-F | 6 | $K_1$ (pN) | 9.8 |
| CGU-2-F | 5 | $K_3$ (pN) | 15.2 |
| CGU-3-F | 5 | | |
| CGU-5-F | 5 | | |
| CCZU-2-F | 5.5 | $\tau_{opt}$ (ms) | 29 |
| CCZU-3-F | 10.5 | d (μm) | 4.1 |
| CCZU-5-F | 5.5 | $d_{opt}$ (μm) | 3.4 |
| CCQU-2-F | 10 | $V_{opt}^{100\,\mu s}$ (V) | 9.9 |
| CCQU-3-F | 10 | $V_{opt}^{1000\,\mu s}$ (V) | 6.5 |
| CCQU-5-F | 10 | $V_{opt}^{10000\,\mu s}$ (V) | 5.0 |
| CC-5-V | 9.5 | | |
| CCPC-33 | 2 | | |
| CCPC-34 | 2 | | |
| CCPC-35 | 2 | | |
| Total | 100 | | |

Example 11

| Compound | Amount (wt %) | $T_{NI}$ (° C.) | 96.6 |
|---|---|---|---|
| CDUQU-3-F | 6 | $\Delta\epsilon$ | 16.2 |
| CGU-2-F | 10 | $\Delta n$ | 0.0930 |

-continued

| Compound | Amount (wt %) | $T_{NI}$ (° C.) | 96.6 |
|---|---|---|---|
| CGU-3-F | 10 | $K_1$ (pN) | 8.5 |
| CGU-5-F | 10 | $K_3$ (pN) | 17.5 |
| CCGU-3-F | 2 | | |
| CCZU-2-F | 6.5 | | |
| CCZU-3-F | 13 | $\tau_{opt}$ (ms) | 31 |
| CCZU-5-F | 6.5 | d (μm) | 4.6 |
| CCQU-2-F | 10 | $d_{opt}$ (μm) | 3.4 |
| CCQU-3-F | 10 | $V_{opt}^{100\,\mu s}$ (V) | 9.7 |
| CCQU-5-F | 10 | $V_{opt}^{1000\,\mu s}$ (V) | 6.4 |
| CCPC-33 | 2 | $V_{opt}^{10000\,\mu s}$ (V) | 5.1 |
| CCPC-34 | 2 | | |
| CCPC-35 | 2 | | |
| Total | 100 | | |

Example 12

| Compound | Amount (wt %) | $T_{NI}$ (° C.) | 96.8 |
|---|---|---|---|
| CGU-2-F | 10 | $\Delta\epsilon$ | 15.5 |
| CGU-3-F | 10 | $\Delta n$ | 0.0934 |
| CGU-5-F | 10 | $K_1$ (pN) | 8.5 |
| CCGU-3-F | 5 | $K_3$ (pN) | 16.9 |
| ACQU-5-F | 10 | | |
| CCZU-2-F | 6 | | |
| CCZU-3-F | 13 | $\tau_{opt}$ (ms) | 28 |
| CCZU-5-F | 6 | d (μm) | 4.6 |
| CCQU-2-F | 8 | $d_{opt}$ (μm) | 3.4 |
| CCQU-3-F | 8 | $V_{opt}^{100\,\mu s}$ (V) | 9.2 |
| CCQU-5-F | 8 | $V_{opt}^{1000\,\mu s}$ (V) | 5.6 |
| CCPC-33 | 2 | $V_{opt}^{10000\,\mu s}$ (V) | 4.3 |
| CCPC-34 | 2 | | |
| CCPC-35 | 2 | | |
| Total | 100 | | |

Example 13

| Compound | Amount (wt %) | $T_{NI}$ (° C.) | 94.9 |
|---|---|---|---|
| CGU-2-F | 10 | $\Delta\epsilon$ | 13.1 |
| CGU-3-F | 10 | $\Delta n$ | 0.0888 |
| CGU-5-F | 10 | $K_1$ (pN) | 9.3 |
| CCGU-3-F | 5 | $K_3$ (pN) | 16.2 |
| CCZU-2-F | 5 | $V_{opt}^{100\,\mu s}$ (V) | 7.2 |
| CCZU-3-F | 10 | | |
| CCZU-5-F | 5 | $\tau_{opt}$ (ms) | 7 |
| CCQU-2-F | 10 | d (μm) | 4.0 |
| CCQU-3-F | 10 | $d_{opt}$ (μm) | 3.5 |
| CCQU-5-F | 10 | | |
| CCOC-3-3 | 5 | $V_{opt}^{1000\,\mu s}$ (V) | 4.4 |
| CCOC-3-5 | 5 | $V_{opt}^{10000\,\mu s}$ (V) | 2.8 |
| CCOC-4-3 | 5 | | |
| Total | 100 | | |

Example 14

| Compound | Amount (wt %) | $T_{NI}$ (° C.) | 98.1 |
|---|---|---|---|
| AUUQU-3-F | 5 | $\Delta\epsilon$ | 22.9 |
| AGUQU-3-F | 5 | $\Delta n$ | 0.0926 |
| APUQU-2-F | 5 | $K_1$ (pN) | 8.3 |
| CDUQU-3-F | 5 | $K_3$ (pN) | 17.9 |
| CGU-2-F | 5 | $V_{opt}^{100\,\mu s}$ (V) | 5.1 |
| CGU-3-F | 5 | | |
| CGU-5-F | 5 | $\tau_{opt}$ (ms) | 6 |
| ACQU-5-F | 10 | d (μm) | 4.1 |
| CCZU-2-F | 5 | $d_{opt}$ (μm) | 3.4 |
| CCZU-3-F | 10 | | |
| CCZU-5-F | 5 | $V_{opt}^{1000\,\mu s}$ (V) | 3.1 |
| CCQU-2-F | 10 | $V_{opt}^{10000\,\mu s}$ (V) | 2.3 |
| CCQU-3-F | 10 | | |
| CCQU-5-F | 10 | | |
| CCPC-33 | 2 | | |
| CCPC-34 | 2 | | |
| CCPC-35 | 1 | | |
| Total | 100 | | |

Example 15

| Compound | Amount (wt %) | $T_{NI}$ (° C.) | 70.3 |
|---|---|---|---|
| CGU-2-F | 11 | $\Delta\epsilon$ | 12.5 |
| CGU-3-F | 11 | $\Delta n$ | 0.1084 |
| CGU-5-F | 11 | $K_1$ (pN) | 7.6 |
| CCZU-2-F | 6 | $K_3$ (pN) | 11.2 |
| CCZU-3-F | 14 | | |
| CCZU-5-F | 6 | | |
| BCH-3F.F.F | 10 | $\tau_{opt}$ (ms) | 16 |
| BCH-5F.F.F | 14 | d (μm) | 4.7 |
| BCH-3F.F | 6 | $d_{opt}$ (μm) | 3.0 |
| ECCP-5F.F | 8 | $V_{opt}^{100\,\mu s}$ (V) | 8.6 |
| CBC-33F | 3 | $V_{opt}^{1000\,\mu s}$ (V) | 5.2 |
| Total | 100 | $V_{opt}^{10000\,\mu s}$ (V) | 3.8 |

Example 16

| Compound | Amount (wt %) | $T_{NI}$ (° C.) | 98.8 |
|---|---|---|---|
| CGU-2-F | 10 | $\Delta\epsilon$ | 10.3 |
| CGU-3-F | 10 | $\Delta n$ | 0.0912 |
| CGU-5-F | 10 | $K_1$ (pN) | 11.3 |
| CCGU-3-F | 6 | $K_3$ (pN) | 15.6 |
| CCZU-2-F | 5 | | |
| CCZU-3-F | 10 | | |
| CCZU-5-F | 5 | $\tau_{opt}$ (ms) | 20 |
| CCQU-2-F | 5 | d (μm) | 4.7 |
| CCQU-3-F | 5 | $d_{opt}$ (μm) | 3.4 |
| CCQU-5-F | 5 | $V_{opt}^{100\,\mu s}$ (V) | 15.4 |
| CC-5-V | 20 | $V_{opt}^{1000\,\mu s}$ (V) | 10.4 |
| CCPC-33 | 3 | $V_{opt}^{10000\,\mu s}$ (V) | 8.6 |
| CCPC-34 | 3 | | |
| CCPC-35 | 3 | | |
| Total | 100 | | |

Example 17

| Compound | Amount (wt %) | $T_{NI}$ (° C.) | 90.0 |
|---|---|---|---|
| CGU-2-F | 10 | $\Delta\epsilon$ | 11.2 |
| CGU-3-F | 10 | $\Delta n$ | 0.1208 |
| CGU-5-F | 10 | $K_1$ (pN) | 8.3 |
| CCGU-3-F | 3 | $K_3$ (pN) | 14.4 |
| CCZU-2-F | 7 | | |
| CCZU-3-F | 15 | | |
| CCZU-5-F | 7 | $\tau_{opt}$ (ms) | 45 |
| BCH-2F.F | 8 | d (µm) | 4.5 |
| BCH-3F.F | 8 | $d_{opt}$ (µm) | 4.4 |
| BCH-5F.F | 8 | $V_{opt}^{100\,\mu s}$ (V) | 18.4 |
| PGIGI-3-F | 8 | $V_{opt}^{1000\,\mu s}$ (V) | 14.5 |
| CCPC-33 | 2 | $V_{opt}^{10000\,\mu s}$ (V) | 12.8 |
| CCPC-34 | 2 | | |
| CCPC-35 | 2 | | |
| Total | 100 | | |

Example 18

| Compound | Amount (wt %) | $T_{NI}$ (° C.) | 95.3 |
|---|---|---|---|
| CGU-2-F | 10 | $\Delta\epsilon$ | 11.1 |
| CGU-3-F | 10 | $\Delta n$ | 0.0967 |
| CGU-5-F | 10 | $K_1$ (pN) | 10.3 |
| CCGU-3-F | 5 | $K_3$ (pN) | 14.6 |
| CCZU-2-F | 6 | | |
| CCZU-3-F | 11 | | |
| CCZU-5-F | 6 | $\tau_{opt}$ (ms) | 24 |
| CCQU-2-F | 5 | d (µm) | 4.6 |
| CCQU-3-F | 5 | $d_{opt}$ (µm) | 3.3 |
| CCQU-5-F | 5 | $V_{opt}^{100\,\mu s}$ (V) | 17.0 |
| D-301 | 5 | $V_{opt}^{1000\,\mu s}$ (V) | 14.3 |
| D-302 | 5 | $V_{opt}^{10000\,\mu s}$ (V) | 13.3 |
| D-401 | 5 | | |
| D-402 | 5 | | |
| CCPC-33 | 2.5 | | |
| CCPC-34 | 2.5 | | |
| CCPC-35 | 2 | | |
| Total | 100 | | |

Example 19

| Compound | Amount (wt %) | $T_{NI}$ (° C.) | 97.3 |
|---|---|---|---|
| CGU-2-F | 6 | $\Delta\epsilon$ | 13.9 |
| CGU-3-F | 6 | $\Delta n$ | 0.0859 |
| CGU-5-F | 6 | $K_1$ (pN) | 8.5 |
| CCGU-3-F | 6 | $K_3$ (pN) | 17.3 |
| CCZU-2-F | 6 | | |
| CCZU-3-F | 14 | | |
| CCZU-5-F | 6 | $\tau_{opt}$ (ms) | 24 |
| CCQU-2-F | 10 | d (µm) | 4.7 |
| CCQU-3-F | 10 | $d_{opt}$ (µm) | 3.6 |
| CCQU-5-F | 10 | $V_{opt}^{100\,\mu s}$ (V) | 7.4 |
| CCQG-2-F | 10 | $V_{opt}^{1000\,\mu s}$ (V) | 3.9 |
| CCQG-3-F | 10 | $V_{opt}^{10000\,\mu s}$ (V) | 3.0 |
| Total | 100 | | |

The invention claimed is:

1. A liquid crystal composition comprising a component ($\pi$) said component ($\pi$) containing one or more compounds of formula I-K and/or I-L

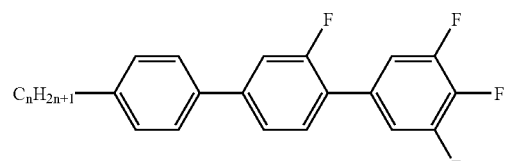

I-K

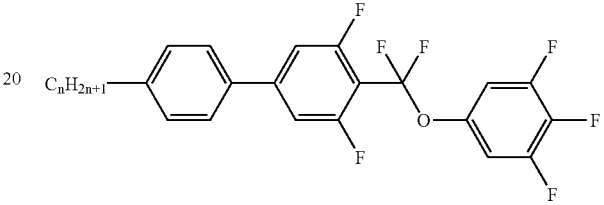

I-L whereby n is an integer from 1 to 8 and one or more compounds of formula II

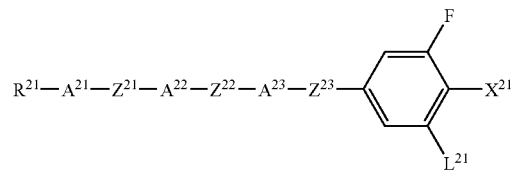

II wherein $R^{21}$ is $C_1$-$C_{15}$ alkyl which is unsubstituted or mono- or poly-substituted with halogen and in which one or more of the $CH_2$ groups may be replaced independently of each other by —O—, —S—, —CH=CH—, —C≡C—, —CO—O—, —OC—O— such that there are no hetero atoms adjacent to each other;

$Z^{21}$, $Z^{22}$, $Z^{23}$ are independently of each other a single bond, —CO—O—, —O—CO—, —CH$_2$O—, —OCH$_2$—, —CF$_2$O—, —OCF$_2$—, —CH$_2$CH$_2$—, (—CH$_2$CH$_2$—)$_2$, —CF=CF—, —CF$_2$CF$_2$—, —CH$_2$CF$_2$—, —CF$_2$CH$_2$—, —CH=CH— or —C≡C—;

$X^{21}$ is F, Cl, SF$_2$, NCS, or a $C_1$ to $C_8$ alkanyl, alkenyl or alkoxy radical substituted with at least one F atom;

$L^{21}$ is H or F; and $A^{21}$, $A^{22}$ and $A^{23}$ are independently of each other one of the following rings:

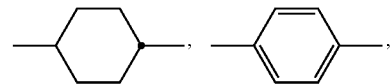

-continued

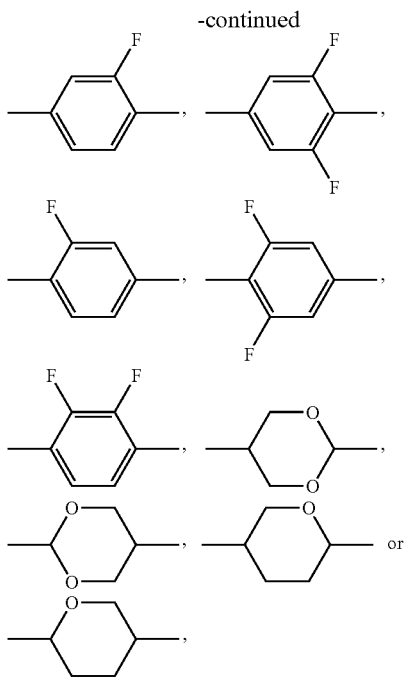

and wherein said liquid crystal composition is free of compounds having an end ring substituted with at least one cyano group.

2. The liquid crystal composition according to claim 1, comprising at least 60 weight % or more, based on the total weight of the composition, of said component (π).

3. A bistable liquid crystal device comprising two outer substrates which, together with a frame, form a cell;

a liquid crystal composition present in said cell;

electrode structures with alignment layers on the inside of said outer substrates whereby at least one alignment layer comprises an alignment grating that permits the compounds of said liquid crystal composition to adopt at least two different stable states whereby the assembly of said electrode structures with said alignment layers being such that in a first driving mode a switching between the said at least two different stable states is achieved by applying suitable electric signals to said electrode structures;

wherein said liquid crystal composition comprises a component (π) said component (π) containing one or more compounds having a phenyl ring of formula A

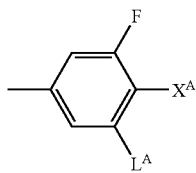

A whereby $X^A$ is F, Cl, SF$_5$, NCS, or a C$_1$ to C$_8$ alkanyl, alkenyl or alkoxy radical substituted with at least one F atom; and $L^A$ is H or F and wherein said liquid crystal composition is free of compounds having an end ring substituted with at least one cyano group.

4. The liquid crystal composition according to claim 1, wherein in formula II $R^{21}$ is a C$_1$ to C$_8$ alkanyl, alkenyl or alkoxy radical unsubstituted or substituted with at least one F atom;

$L^{21}$ is F;

$X^{21}$ is F or Cl;

$Z^{21}$, $Z^{22}$ and $Z^{23}$ are each a single bond, —CF$_2$O— or —CO—O— whereby at least two of $Z^{21}$, $Z^{22}$ and $Z^{23}$ are each a single bond;

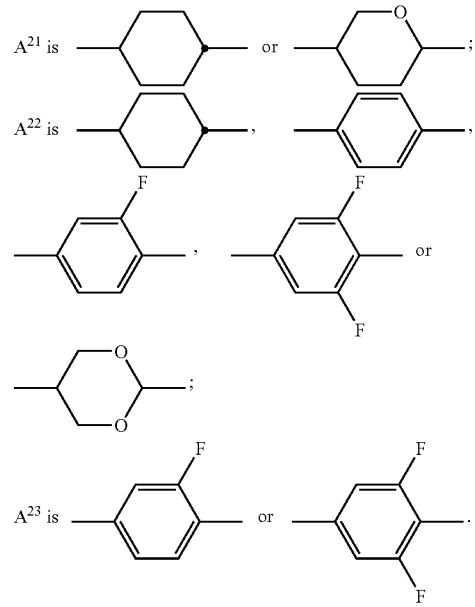

5. The Liquid crystal composition according to claim 4, wherein the compounds of formula II are one or more of the following formulas:

II-A

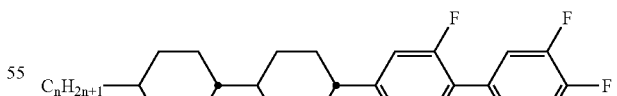

II-B

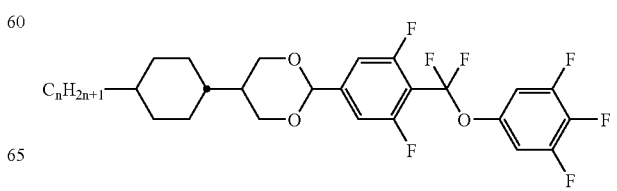

-continued

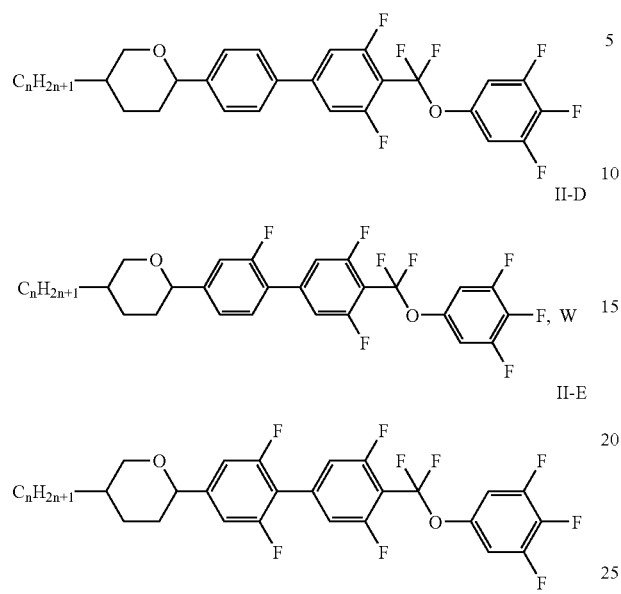

II-C

II-D

II-E whereby n is an integer from 1 to 8.

6. The liquid crystal composition according to claim 1, comprising 80 weight % or more (based on the total weight of the composition) of said component (π).

7. The liquid crystal composition according to claim 1, further comprising one or more of the following compounds:

III

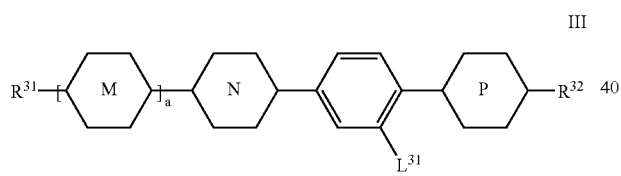

IV

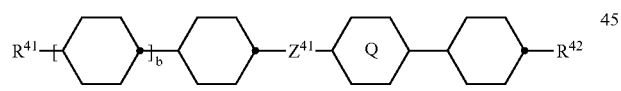

V

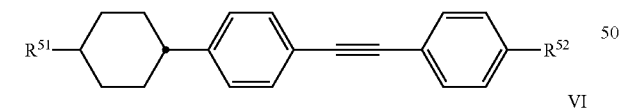

VI

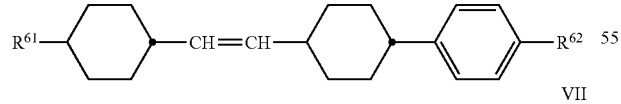

VII

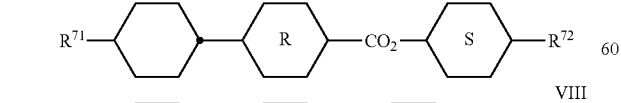

VIII

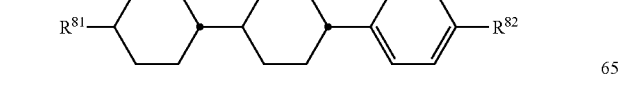

in which a and b are independently of each other 0 or 1;

$R^{31}$, $R^{32}$, $R^{41}$, $R^{42}$, $R^{51}$, $R^{52}$, $R^{61}$, $R^{62}$, $R^{71}$, $R^{72}$, $R^{81}$ and $R^{82}$ are independently of each other $C_1$-$C_{15}$ alkyl which is unsubstituted or mono- or poly-substituted with halogen and in which one or more of the $CH_2$ groups may be replaced independently of each other by —O—, —S—, —CH=CH—, —C≡C—, —CO—O—, —OC—O— such that there are no hetero atoms adjacent to each other;

$L^{31}$ is H or F;

$Z^{41}$ is —CO—O—, —$CH_2$O—, —O$CH_2$—, —$CF_2$O—, —O$CF_2$—, —$CH_2CH_2$—, —$CF_2CF_2$—, —$CH_2CF_2$—, —$CF_2CH_2$—, —CH=CH— or —C≡C—;

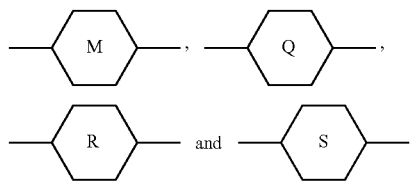

are independently of each other

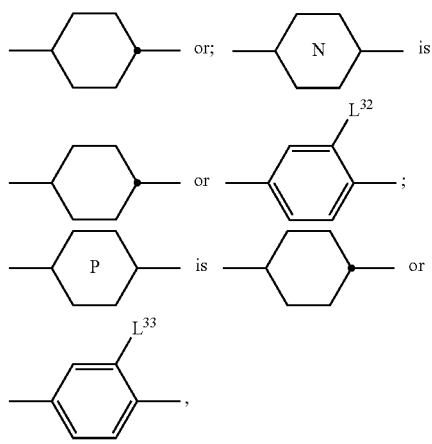

in which $L^{32}$ and $L^{33}$ are independently of each other H or F.

8. The liquid crystal composition according to claim 1, further comprising one or more of the following compounds:

IX

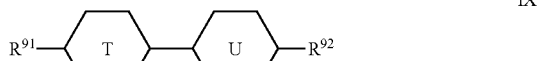

X

XI

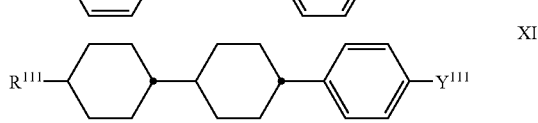

-continued

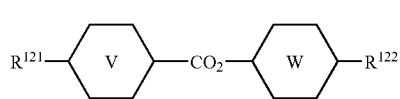

XII in which

R$^{91}$, R$^{92}$, R$^{101}$, R$^{102}$, R$^{111}$, R$^{121}$ and R$^{122}$ are independently of each other C$_1$-C$_{15}$ alkyl which is unsubstituted or mono- or poly-substituted with halogen and in which one or more of the CH$_2$ groups may be replaced independently of each other by —O—, —S—, —CH=CH—, —C≡C—, —CO—O—, —OC—O— such that there are no hetero atoms directly linked to each other; preferably these radicals are independently of each other straight-chain alkanyl, alkenyl or alkoxy radicals with up to 8 carbon atoms;

Y$^{111}$ is C$_1$-C$_{15}$ alkanyl or C$_2$-C$_{15}$ alkenyl that are independently of each other mono- or poly-substituted with halogen, or C$_1$-C$_{15}$ alkoxy which is mono- or poly-substituted with halogen; preferably it is an alkanyl or an alkoxy radical with up to 8 carbon atoms in which each of the hydrogen atoms are replaced by F; and

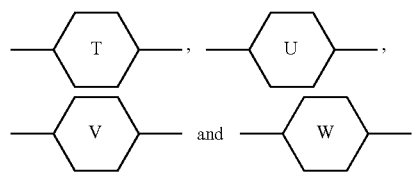

are independently of each other

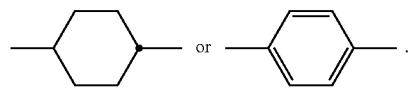

9. The liquid crystal composition according to claim 1, further comprising one or more of the following compounds:

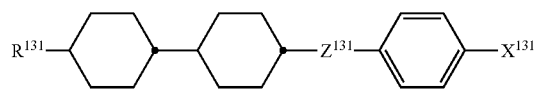
XV

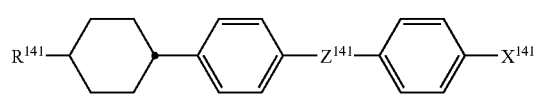
XVI in which

R$^{131}$ and R$^{141}$ are independently of each other C$_1$-C$_{15}$ alkyl which is unsubstituted or mono- or poly-substituted with halogen and in which one or more of the CH$_2$ groups may be replaced independently of each other by —O—, —S—, —CH=CH—, —C≡C—, —CO—O—, —OC—O— such that there are no hetero atoms directly linked to each other; preferably these radicals are independently of each other straight-chain alkanyl, alkenyl or alkoxy radicals with up to 8 carbon atoms;

X$^{131}$ and X$^{141}$ are independently of each other F or Cl, preferably F; and Z$^{131}$ and Z$^{141}$ are independently of each other a single bond, —CF$_2$O— or —CO—O—, preferably a single bond.

10. A device according to claim 3, wherein the compounds having a phenyl ring A are one or more of the following formulas:

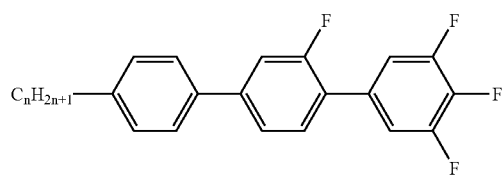
I-K

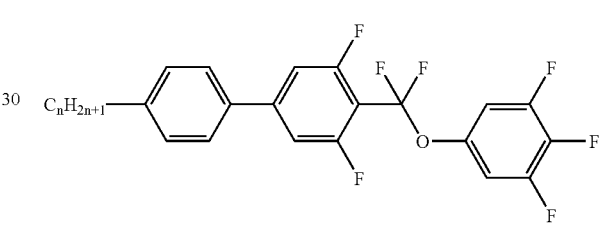
I-L whereby n is an integer from 1 to 8.

11. The bistable liquid crystal device according to claim 3, which it is a zenithal bistable nematic liquid crystal device.

12. The bistable liquid crystal device according to claim 3, having a first driving mode which is an active matrix (AM) mode.

13. The bistable liquid crystal device according to claim 3, wherein said device comprises electrode structures the assembly of which allowing said switching between said at least two different stable states in said first driving mode and a switching of said liquid crystal composition in a second monostable driving mode.

14. The bistable liquid crystal device according to claim 13, wherein said second monostable driving mode is an active matrix (AM) mode.

15. The bistable liquid crystal device according to claim 14, wherein said second driving mode is a twisted nematic (TN) TFT mode or a vertically aligned nematic (VAN) TFT mode.

* * * * *

UNITED STATES PATENT AND TRADEMARK OFFICE
CERTIFICATE OF CORRECTION

PATENT NO. : 7,670,502 B2
APPLICATION NO. : 10/590353
DATED : March 2, 2010
INVENTOR(S) : Francis et al.

It is certified that error appears in the above-identified patent and that said Letters Patent is hereby corrected as shown below:

Column 78, line 56 reads "$X^{21}$ is F, Cl, $SF_2$, NCS, or a $C_1$ to $C_8$ alkanyl, alkenyl or" should read -- $X^{21}$ is F, Cl, $SF_5$, NCS, or a $C_1$ to $C_8$ alkanyl, alkenyl or --.

Signed and Sealed this

Eleventh Day of May, 2010

David J. Kappos
*Director of the United States Patent and Trademark Office*